US012326203B2

(12) United States Patent
Saphira et al.

(10) Patent No.: US 12,326,203 B2
(45) Date of Patent: Jun. 10, 2025

(54) DOWNHOLE TOOL WITH CRACK COMPLIANT SEAL AND MECHANICAL STRENGTHENING FEATURE AT A JOINT THEREOF

(71) Applicant: Halliburton Energy Services, Inc., Houston, TX (US)

(72) Inventors: Dara Saphira, Carrollton, TX (US); Alireza Yazdanshenas, Carrollton, TX (US); Stacey Blaine Donovan, Carrollton, TX (US); David Joe Steele, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/348,205

(22) Filed: Jul. 6, 2023

(65) Prior Publication Data

US 2025/0003532 A1  Jan. 2, 2025

Related U.S. Application Data

(60) Provisional application No. 63/511,392, filed on Jun. 30, 2023.

(51) Int. Cl.
*F16L 13/02* (2006.01)
*E21B 17/043* (2006.01)

(52) U.S. Cl.
CPC .......... *F16L 13/02* (2013.01); *E21B 17/043* (2013.01)

(58) Field of Classification Search
CPC ................................ E21B 17/04; E21B 33/12
See application file for complete search history.

(56) References Cited

U.S. PATENT DOCUMENTS 2,289,271 A * 7/1942 Kane .................. E21B 17/08
166/242.6
2,662,277 A   12/1953 Stone
(Continued)

FOREIGN PATENT DOCUMENTS

CN    201407423 Y   2/2010
CN    104818427 B   1/2017
(Continued)

OTHER PUBLICATIONS

Zumpano, P., Jr., et al., "Welding and NDT of Alloy 625 as CRA in Offshore Pipelines and Risers," Rio Pipeline Conference and Exposition, Sep. 24-26, 2013, 9 pages.

*Primary Examiner* — Steven A Macdonald
(74) *Attorney, Agent, or Firm* — Scott Richardson; Parker Justiss, P.C.

(57) ABSTRACT

Provided is a downhole tool, a well system and a method. The downhole tool, in one aspect, includes a first member, the first member having a first member hardness value ($HV_1$), and a second member, the second member having a second member hardness value ($HV_2$), the first and second members positioned proximate one another forming an overlapping space therebetween. The downhole tool according to this aspect, further includes a mechanical strengthening feature located between the first member and the second member, the mechanical strengthening feature configured to increase an engineering rating of the overlapping space, and a crack compliant seal positioned at the overlapping space, the crack compliant seal having a compliant seal hardness value ($HV_{cs}$) less than or equal to one or more of the ($HV_1$) or the ($HV_2$).

29 Claims, 25 Drawing Sheets

(56) References Cited

U.S. PATENT DOCUMENTS

Figure 1:
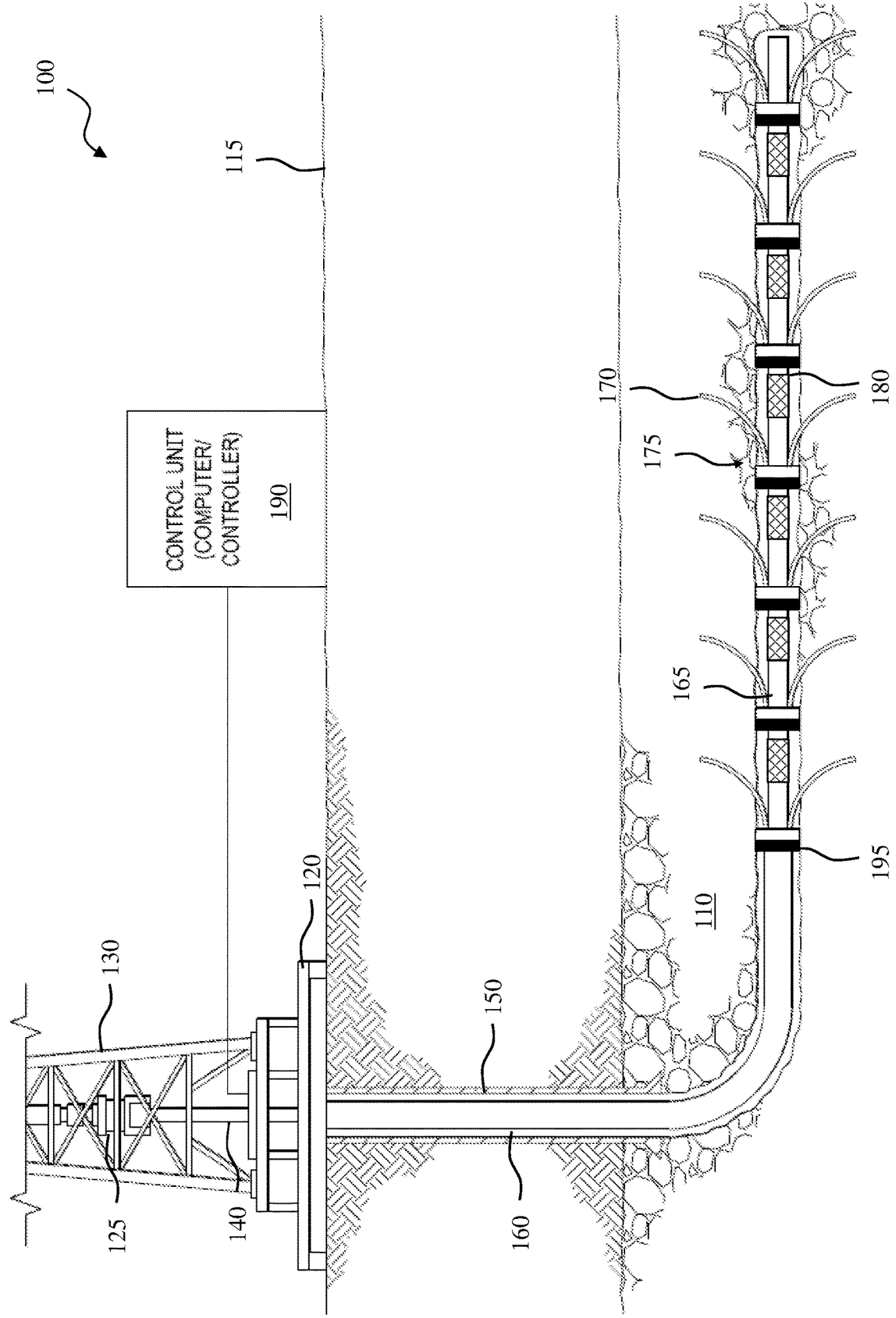

| | | | |
|---|---|---|---|
| 3,193,918 A | 7/1965 | Heldenbrand | |
| 3,943,618 A * | 3/1976 | Perkins | E21B 17/00 29/445 |
| 4,240,652 A * | 12/1980 | Wong | F16L 13/007 285/91 |
| 4,326,117 A | 4/1982 | Kanne, Jr. et al. | |
| 4,624,316 A * | 11/1986 | Baldridge | E21B 21/10 137/515 |
| 4,702,406 A | 10/1987 | Sullivan et al. | |
| 4,710,245 A | 12/1987 | Roether | |
| 4,813,714 A * | 3/1989 | Fairey | F16L 15/04 285/94 |
| 4,915,426 A * | 4/1990 | Skipper | F16L 15/003 285/288.1 |
| 4,951,753 A * | 8/1990 | Eriksen | E21B 34/063 166/321 |
| 5,258,600 A | 11/1993 | Arthur | |
| 5,992,518 A | 11/1999 | Whitlock | |
| 6,322,642 B1 | 11/2001 | Bocquet et al. | |
| 7,169,408 B2 | 1/2007 | Fischetti et al. | |
| 7,775,287 B2 * | 8/2010 | Duggan | E21B 10/42 166/242.6 |
| 7,900,718 B2 * | 3/2011 | Lyons | E21B 10/62 175/320 |
| 8,201,648 B2 * | 6/2012 | Choe | C22C 9/04 175/425 |
| 8,309,018 B2 | 11/2012 | Smith et al. | |
| 8,322,592 B2 | 12/2012 | Kiuchi et al. | |
| 8,381,844 B2 * | 2/2013 | Matthews, III | E21B 10/42 175/425 |
| 9,133,693 B2 * | 9/2015 | Wasa Tverlid | E21B 43/106 |
| 10,060,225 B2 * | 8/2018 | Wolf | E21B 23/12 |
| 10,323,153 B2 | 6/2019 | Kurahashi et al. | |
| 10,335,855 B2 | 7/2019 | Welch et al. | |
| 10,961,824 B2 | 3/2021 | Steele et al. | |
| 11,454,083 B2 | 9/2022 | Asthana et al. | |
| 11,668,163 B2 | 6/2023 | Asthana et al. | |
| 2003/0049485 A1 | 3/2003 | Brupbacher et al. | |
| 2007/0102198 A1 * | 5/2007 | Oxford | B22F 7/062 175/374 |
| 2007/0102202 A1 * | 5/2007 | Choe | B22F 7/062 175/425 |
| 2008/0135304 A1 * | 6/2008 | Duggan | E21B 10/00 175/325.2 |
| 2011/0180271 A1 | 7/2011 | Brekke et al. | |
| 2012/0175020 A1 | 7/2012 | Imamura et al. | |
| 2013/0076028 A1 * | 3/2013 | Pallini, Jr. | E21B 17/085 285/343 |
| 2013/0136540 A1 | 5/2013 | Jones et al. | |
| 2013/0140813 A1 * | 6/2013 | Pallini, Jr. | E21B 17/085 285/322 |
| 2016/0047502 A1 * | 2/2016 | Varghese | E21B 17/08 285/89 |
| 2017/0350199 A1 * | 12/2017 | Pallini | E21B 17/046 |
| 2019/0145570 A1 | 5/2019 | Raghunathan et al. | |
| 2019/0321914 A1 | 10/2019 | Denney et al. | |
| 2021/0071807 A1 | 3/2021 | Alghamdi | |
| 2022/0143734 A1 | 5/2022 | Bunker et al. | |
| 2022/0205336 A1 | 6/2022 | Asthana et al. | |
| 2022/0205341 A1 | 6/2022 | Asthana et al. | |
| 2022/0205470 A1 | 6/2022 | Asthana et al. | |

FOREIGN PATENT DOCUMENTS

| | | |
|---|---|---|
| ES | 2220020 T3 | 12/2004 |
| GB | 2586170 B | 5/2022 |
| JP | 2011240356 A | 12/2011 |
| JP | 5799610 B2 | 10/2015 |
| WO | 2012024047 A1 | 2/2012 |
| WO | 2014080281 A2 | 5/2014 |

* cited by examiner

DOWNHOLE TOOL WITH CRACK COMPLIANT SEAL AND MECHANICAL STRENGTHENING FEATURE AT A JOINT THEREOF

CROSS-REFERENCE TO RELATED APPLICATION

This application claims the benefit of U.S. Provisional Application Ser. No. 63/511,392, filed on Jun. 30, 2023, entitled "DOWNHOLE TOOL WITH CRACK COMPLIANT SEAL AND HIGH YIELD STRENGTH WELD POSITIONED AT A JOINT THEREOF," commonly assigned with this application and incorporated herein by reference in its entirety.

BACKGROUND

Traditional tubular joints that perform simultaneous anchoring and sealing between two different parts may be achieved by using a combination of geometric mechanical joining methods, and sealing elements or inserts (e.g., elastomeric/plastic/metal). For example, geometric mechanical joining methods including non-sealing threads, snap rings, collets, Ratch Latch™, lock rings, bolting/riveting and other type of latching methods are often used.

BRIEF DESCRIPTION

Reference is now made to the following descriptions taken in conjunction with the accompanying drawings, in which:

FIG. 1 illustrates a well system designed, manufactured, and operated according to one or more embodiments of the disclosure, and including a multilateral junction (e.g., y-block and two or more wellbore legs), and/or an interval control valve (ICV), and/or downhole packer, designed, manufactured and operated according to one or more embodiments of the disclosure; and FIGS. 2 through 23 illustrate various different embodiments for downhole tools including improved joints designed, manufactured and operated according to one or more embodiments of the disclosure.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the ground; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

The present disclosure is based, at least in part, on the recognition that there is an ever increasing need to design and/or develop downhole tools capable of handling greater collapse and/or burst pressures. Additionally, the newly developed downhole tools need to be corrosion resistant, or in certain instances at a minimum National Association of Corrosion Engineers (NACE) compliant, and/or International Organization for Standardization (ISO) compliant. Specifically, the downhole tools, and any joints that they may have, may need to be corrosion resistant to hydrogen sulfide ($H_2S$) gas, but in certain embodiments corrosion resistant to carbon dioxide ($CO_2$) gas and/or hydrogen ($H_2$) gas. Unfortunately, as recognized in the present disclosure, high yield strength joints tend to lack the necessary NACE/ISO compliance, and NACE/ISO compliant joints tend to lack the necessary yield strength.

Other environments which may comprise corrosive fluids (hydrocarbons, $H_2S$ fluids, $CO_2$ fluids, acids, bases, etc.), contaminants (sand, debris, paraffins, asphaltenes, etc.), high-temperature fluids (fluids from geothermal formations, injected fluids, etc.), cryogenic fluids, etc. may benefit from this disclosure as well. Moreover, the ability to provide systems and methods for making and utilizing tubular joints capable of providing both high yield strength and crack compliance for use in harsh conditions (e.g., corrosive environments or contaminated fluids), extreme pressures (e.g., >5,000-psi differential), extreme temperatures (e.g., >−20° F. or >300° F.), and/or in remote locations, makes this disclosure suitable for use in other remote locations with harsh environments such as outer space (e.g., satellites, spacecrafts, etc.), aeronautics (aircrafts, drones), on-ground (swamps, marshes, power generation, hydrogen or other gas extraction and/or transportation, etc.), below ground (mines, caves, etc.), ocean (on surface and subsea), subterranean (mineral extraction, storage wells (carbon sequestration, carbon capture and storage (CCS), etc.)), and other energy recovery activities (geothermal, steam, etc.).

With these recognitions in mind, the present disclosure has developed one or more different designs for tubular joints providing both crack compliance (e.g., NACE/ISO compliance) and high yield strength. In at least one embodiment, the downhole tool includes first and second members positioned proximate one another to form an overlapping space therebetween, and then both a crack compliant seal (e.g., crack compliant compound, solder, braze, weld, etc.) and a high yield strength weld are positioned at the joint, the high yield strength weld having a yield strength of at least 50 kilopound per square inch (ksi). In such a circumstance, a joint with both crack compliance and a yield strength of at least 50 ksi may be obtained. In at least one other embodiment, the high yield strength weld may have a yield strength of at least 80 ksi, which may provide a joint with both crack compliance and a yield strength of at least 80 ksi. In at least one other embodiment, first and second members are positioned proximate one another to form an overlapping space therebetween, and a geometric mechanical strengthening feature (e.g., configured to increase an engineering rating of the overlapping space, such as the burst rating and/or collapse rating and/or tensile rating and/or compression rating and/or any combination thereof) and the crack compliant seal (e.g., crack compliant compound, solder, braze, and/or weld, etc.) are used. In such a circumstance, a mechanically strengthened joint with both crack compliance and a yield strength of at least 50 ksi (e.g., or even 80 ksi) may also be obtained.

As will be understood more fully below, the crack compliant seal may comprise many different materials and/or structures/locations and remain within the scope of the present disclosure. In at least one embodiment, the crack compliant seal has a compliant seal hardness value ($HV_{cs}$) less than or equal to one or more of the first member hardness value ($HV_1$) or second member hardness value ($HV_2$). The hardness values (HV) may be measured using the Vickers hardness test. Accordingly, the hardness values (HV) may be determined with the ratio F/Q, where F is the force applied to a diamond in the form of a square-based pyramid in kilograms-force (kgf), and A is the surface area of the resulting indentation in square millimeters (mm). In at least one embodiment, A can be determined by the formula: $A=d^2/2 \sin(136°/2)'$, which can be approximated by evaluating the sine term to give, $A \approx d^2/1.8544'$, where d is the average length of the diagonal left by the indenter in millimeters. Thus, in at least one embodiment the hardness value (HV) is approximately equal to $1.8544F/d^2$, where F is in kgf and d is in millimeters.

Further to at least one embodiment, the compliant seal hardness value ($HV_{cs}$) is a post weld heat treatment compliant seal hardness value ($HV_{cs-pw}$). In at least one other embodiment, the post weld compliant seal hardness value ($HV_{cs-pw}$) is 250 or less. In yet another embodiment, the post weld compliant seal hardness value ($HV_{cs-pw}$) is 250 or less after being subjected to the post weld heat treatment of at least 620° C. In even another embodiment, the crack compliant seal includes no more than 1% mass fraction of nickel. In even another embodiment, the compliant seal comprises (e.g., in whole or in part) a non-metallic material, such as polyether ether ketone (PEEK), fluorocarbon rubber (VITON®), a polymer, a synthetic polymer (e.g., hydrogenated nitrile "HNBR"), etc.

In even yet another embodiment, the crack compliant seal is a NACE/ISO compliant seal. For example, the NACE/ISO compliant seal, which would form a NACE/ISO compliant junction with the first and second members, would be selected from the NACE/ISO compliant seals, junctions, and/or first and second members, as set forth in ANSI/NACE MR0175/ISO (15156-1:2015), entitled "*Petroleum, petrochemical, and natural gas industries—Materials for use in $H_2S$-containing environments in oil and gas production*," the entirety of which is incorporated herein by reference, as if it were fully reproduced herein. In the event of inconsistent usages between this disclosure and the ANSI/NACE MR0175/ISO (15156-1:2015) so incorporated by reference, the usage in ANSI/NACE MR0175/ISO (15156-1:2015) should be considered supplementary to that of this disclosure; for irreconcilable inconsistencies, the usage in this disclosure controls.

In at least one embodiment, the NACE/ISO compliant seal has a pitting-resistance equivalent number (PREN or $F_{PREN}$) of at least 30. In yet another embodiment, the $F_{PREN}$ is at least 35, if not somewhere between 30 and 40. In yet another embodiment, the $F_{PREN}$ is at least 40, if not somewhere between 35 and 45. In yet another embodiment, the $F_{PREN}$ is at least 40, if not somewhere between 40 and 45. In these embodiments, the PREN ($F_{PREN}$) shall be calculated as given in Formula (1):

$$F_{PREN} = w_{Cr} + 3.3(w_{Mo} + 0.5w_w) + 16w_N \tag{1}$$

where
$wC_r$ is the mass fraction of chromium in the alloy, expressed as a percentage mass fraction of the total composition;
$wM_M$ is the mass fraction of molybdenum in the alloy, expressed as a percentage mass fraction of the total composition;
wW is the mass fraction of tungsten in the alloy, expressed as a percentage mass fraction of the total composition; and
wN is the mass fraction of nitrogen in the alloy, expressed as a percentage mass fraction of the total composition.

In at least one other embodiment, the high yield strength weld is a very high yield strength weld having a yield strength of at least 95 ksi, a super high yield strength weld having a yield strength of at least 110 ksi, of an extremely high yield strength weld having a yield strength of at least 125 ksi, or an excessively high yield strength weld having a yield strength of at least 140 ksi.

The term "yield strength," as used herein, is the stress at which a material exhibits a specified deviation from the proportionality of stress to strain. The term "braze," as used herein, means joining metals by flowing a thin layer (e.g., of capillary thickness) of a lower-melting-point non-ferrous filler. The term "weld," as used herein, means the joining of two or more pieces of metal by applying heat and/or pressure with or without filler metal, to produce a union through localized fusion of the substrates and solidification across the interfaces.

FIG. 1 illustrates a well system 100 designed, manufactured, and operated according to one or more embodiments of the disclosure, and including a multilateral junction 175 (e.g., y-block and two or more wellbore legs) and/or interval control valve (ICV) 180 designed, manufactured and operated according to one or more embodiments of the disclosure. In accordance with at least one embodiment, the multilateral junction 175 and/or ICV 180 could include joints as disclosed herein. The well system 100 additionally includes one or more packers 185 designed, manufactured and operated according to one or more embodiments of the disclosure. In accordance with at least one embodiment, the one or more packers 185 could include joints as disclosed herein. While not illustrated, the joints of the present disclosure may be used to join any two members employed downhole within the well system 100.

The well system 100 includes a platform 120 positioned over a subterranean formation 110 located below the earth's surface 115. The platform 120, in at least one embodiment, has a hoisting apparatus 125 and a derrick 130 for raising and lowering a downhole conveyance 140, such as a drill string, casing string, tubing string, coiled tubing, etc. Although a land-based oil and gas platform 120 is illustrated in FIG. 1, the scope of this disclosure is not thereby limited, and thus could potentially apply to offshore applications.

The teachings of this disclosure may also be applied to other land-based multilateral wells different from that illustrated.

The well system 100 in one or more embodiments includes a main wellbore 150. The main wellbore 150, in the illustrated embodiment, includes tubing 160, 165, which may have differing tubular diameters. Extending from the main wellbore 150, in one or more embodiments, may be one or more lateral wellbores 170. Furthermore, a plurality of multilateral junctions 175 may be positioned at junctions between the main wellbore 150 and the lateral wellbores 170. Each multilateral junction 175 may comprise a y-block and/or legs (e.g., mainbore leg and/or lateral bore leg) designed, manufactured or operated according to the disclosure. As discussed above, the multilateral junctions 175 may include the novel joints disclosed herein.

The well system 100 may additionally include the one or more ICVs 180 positioned at various positions within the main wellbore 150 and/or one or more of the lateral wellbores 170. The ICVs 180 may comprise an ICV designed, manufactured or operated according to the disclosure. As discussed above, one or more of the ICVs 180 could include the novel joints discussed herein, including in the sand control screen portion. The well system 100 may additionally include a control unit 190. The control unit 190, in this embodiment, is operable to provide control to or receive signals from, one or more downhole devices.

The well system may additionally include one or more packers 195 (e.g., zonal isolation production packers). The packers 195 may be designed, manufactured or operated according to the disclosure. As discussed above, one or more of the packers 195 could include the novel joints discussed herein.

Figure 2:
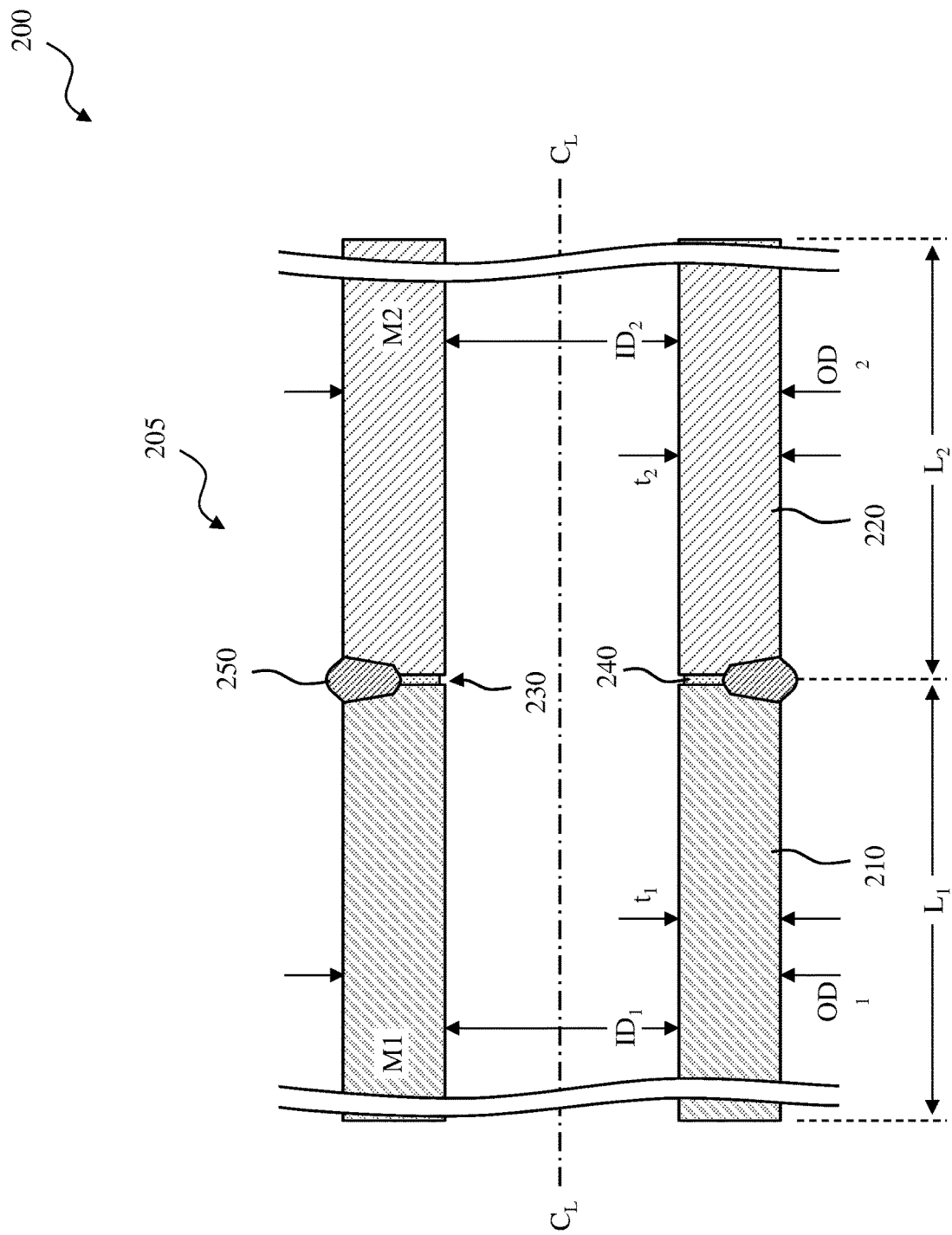

Turning to FIG. 2, depicted is a cross-sectional view of a downhole tool 200 including a junction 205 designed, manufactured and operated according to one or more embodiments of the disclosure. The junction 205 of FIG. 2 includes a first member 210 and second member 220. In accordance with one or more embodiments of the disclosure, the first member 210 comprises a first material (M1) and the second member 220 comprises a second material (M2). In certain embodiments, the first material (M1) and the second material (M2) are the same material, but in other embodiments the first material (M1) and the second material (M2) are different materials. In one or more embodiments, the first material (M1) and the second material (M2) comprise a crack compliant material. In at least one embodiment, the first material (M1) and the second material (M2) comprise a material having a yield strength of no greater than 140 ksi, if not no greater than 125 ksi, if not no greater than 110 ksi, if not no greater than 95 ksi, if not no greater than 80 ksi, if not no greater than 50 ksi.

In the illustrated embodiment, and in accordance with the disclosure, the first member 210 has a first member inside diameter ($ID_1$), a first member outside diameter ($OD_1$), a first member thickness ($t_1$), and a first member hardness value ($HV_1$). In the illustrated embodiment, and in accordance with the disclosure, the second member 220 has a second member inside diameter ($ID_2$), a second member outside diameter ($OD_2$), a second member thickness ($t_2$), and a second member hardness value ($HV_2$).

In accordance with one embodiment of the disclosure, the first member 210 and the second member 220 overlap one another. Depending on the design, the overlap may be face-to-face, end-to-end, butt-to-butt, or any other overlap, as well as combinations of the same. The first member 210 and the second member 220, in the illustrated embodiment, thus define an overlapping space 230. The overlapping space 230, in at least one or more embodiments, defines the type of junction. For example, in the embodiment of FIG. 2, the overlapping space 230 is a radially extending space that would result in a butt joint. However, in other embodiments, the overlapping space 230 could be an angled radially extending space that would result in an angled butt joint. In even yet other embodiments, the overlapping space 230 could be a single stepped overlapping space (e.g., where a portion of one member extends within a portion of the other member), which would tend to form a single step overlapping joint, as further discussed below.

While not required, the first member 210 and the second member 220 may be a first tubular and a second tubular, such as in the embodiment discussed with regard to FIG. 2. Accordingly, the first member 210 and the second member 220 may define a centerline ($C_L$). In other embodiments, however, one or both of the first member 210 or the second member 220 are not tubulars. In at least one embodiment, the second member 220 is a collet (e.g., a pressure-containing collet) being coupled to the first member 210.

In the illustrated embodiment, the first member 210 has a length ($L_1$) and the second member 220 has a length ($L_2$). In the illustrated embodiment, at least a portion of the overlapping space 230 (and thus the resulting metal joint) is substantially perpendicular with the length ($L_1$), thus forming a radially extending portion of the overlapping space 230. As will be understood herein, the overlapping space may be substantially perpendicular to the centerline ($C_L$), or in certain other embodiments not perpendicular to the centerline ($C_L$) (e.g., substantially parallel with the centerline ($C_L$)). As will be discussed below, other embodiments exist wherein at least a portion of the overlapping space 230 (and thus the resulting metal joint) is substantially parallel with the length ($L_1$) (e.g., forming an axially extending portion of the overlapping space 230) and/or angled relative to the length ($L_1$).

In the illustrated embodiment, the downhole tool 200 includes a crack compliant seal 240 positioned at the overlapping space 230, the crack compliant seal 240 having a compliant seal hardness value ($HV_{cs}$) less than or equal to one or more of the first member hardness value ($HV_1$) or second member hardness value ($HV_2$). Accordingly, the crack compliant seal 240 is positioned in at least a portion of the radially extending portion of the overlapping space 230. The crack compliant seal 240 may comprise any of the crack compliant materials discussed above and remain within the purview of the disclosure. In the illustrated embodiment, the crack compliant seal 240 is a crack compliant brazed seal, and thus was positioned within the overlapping space 230 using a conventional brazing process. In other embodiments, the crack compliant seal 240 could be a crack compliant weld, or another type of crack compliant seal.

As indicated above, the compliant seal hardness value ($HV_{cs}$) may be a post weld heat treatment compliant seal hardness value ($HV_{cs-pw}$). Furthermore, in at least one embodiment, the post weld compliant seal hardness value ($HV_{cs-pw}$) may be 250 or less. In yet another embodiment, the post weld compliant seal hardness value ($HV_{cs-pw}$) may be 250 or less after being subjected to the post weld heat treatment of at least 620° C. In even another embodiment, the crack compliant seal may include no more than 1% mass fraction of nickel.

In the illustrated embodiment, a high yield strength weld 250 is also positioned at the overlapping space 230. In accordance with the disclosure, the high yield strength weld 250 has a yield strength of at least 80 ksi. As discussed above, the high yield strength weld 250 could also have a yield strength of at least 95 ksi, a yield strength of at least 110 ksi, a yield strength of at least 125 ksi, a yield strength of at least 140 ksi, or even greater. The location of the high yield strength weld 250 relative to the crack compliant seal 240 may be dependent on the location of a source of corrosive fluid (e.g., $H_2S$ gas, $CO_2$ gas, $H_2$ gas, etc.). For example, if the corrosive fluid were located on the inside of the first member 210 and the second member 220, the crack compliant seal 240 would ideally be located radially inside of the high yield strength weld 250, such as in the embodiment of FIG. 2.

Figure 3:
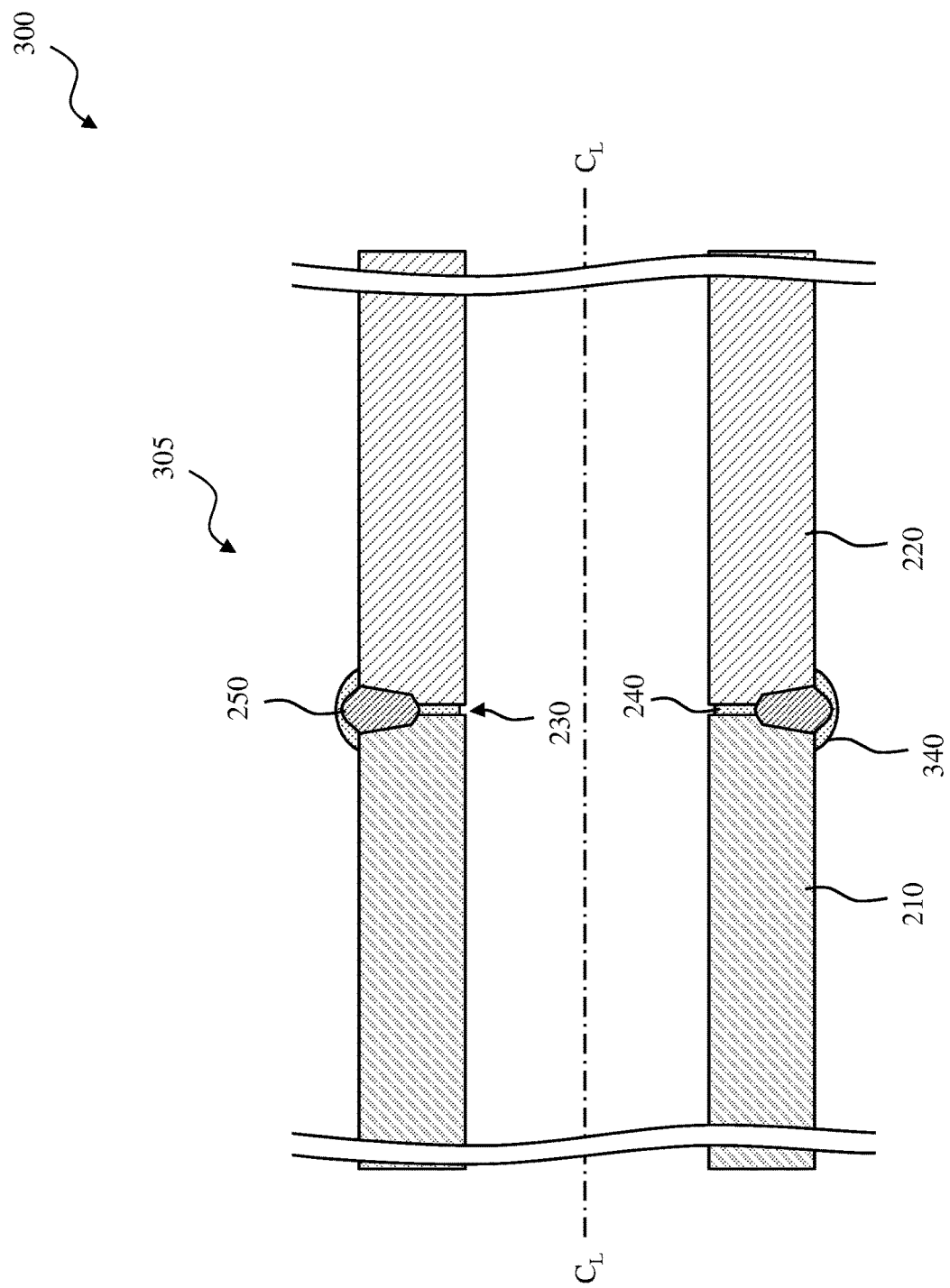

Turning to FIG. 3, depicted is a cross-sectional view of a downhole tool 300 including a junction 305 designed, manufactured and operated according to one or more alternative embodiments of the disclosure. The downhole tool 300 having the junction 305 is similar in many respects to the downhole tool 200 of FIG. 2. Accordingly, like reference numbers have been used to indicate similar, if not identical, features. The downhole tool 300 differs, for the most part, from the downhole tool 200, in that the downhole tool 300 contemplates corrosive fluid additionally on the outside of the first member 210 and the second member 220. Accordingly, in the embodiment of FIG. 3, a second crack compliant seal 340 is located radially outside of the high yield strength weld 250. In one or more embodiments, the second crack compliant seal 340 is a crack compliant weld, as shown.

Figure 4:
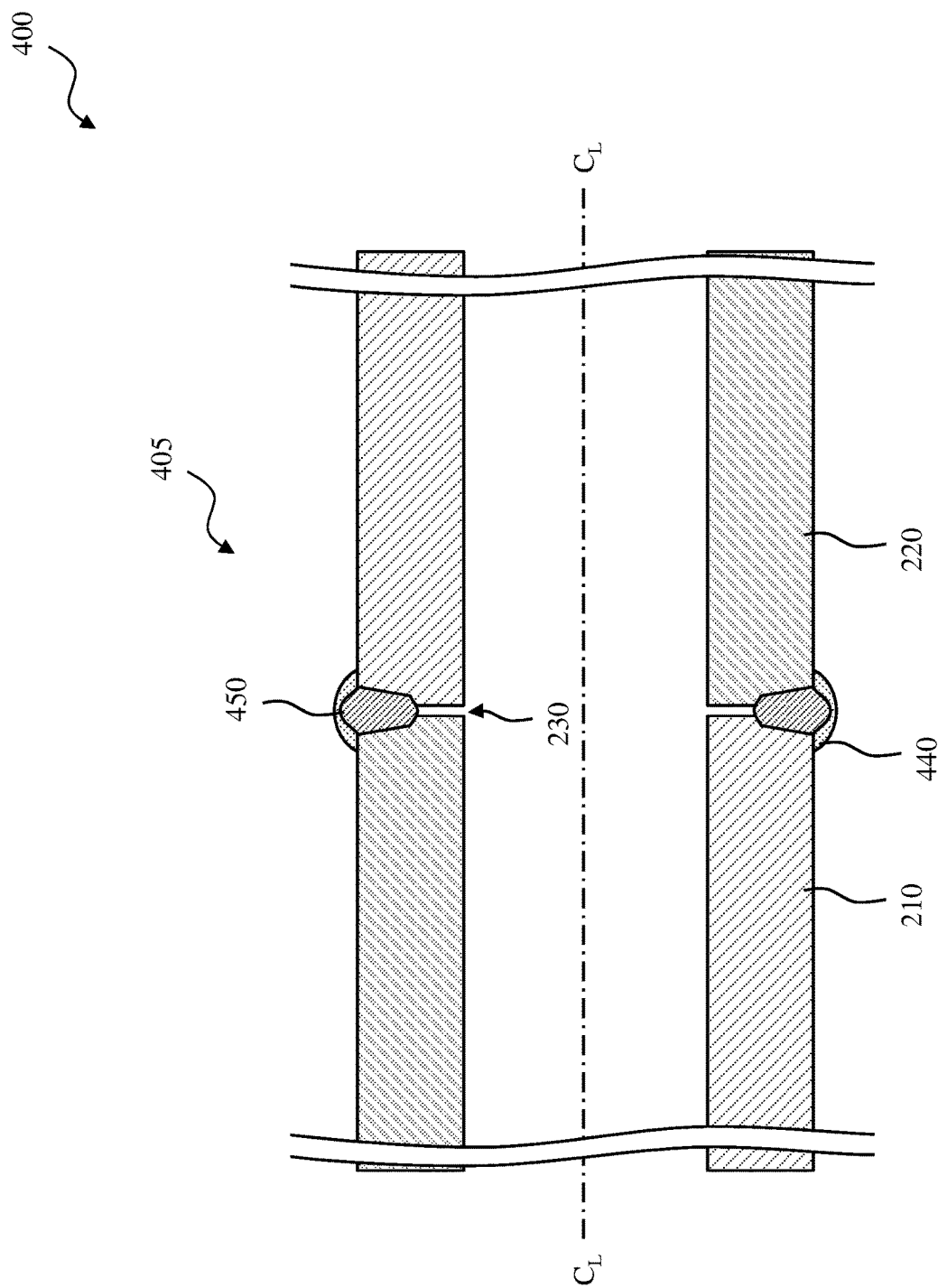

Turning to FIG. 4, depicted is a cross-sectional view of a downhole tool 400 including a junction 405 designed, manufactured and operated according to one or more alternative embodiments of the disclosure. The downhole tool 400 having the junction 405 is similar in many respects to the downhole tool 200 of FIG. 2. Accordingly, like reference numbers have been used to indicate similar, if not identical, features. The downhole tool 400 differs, for the most part, from the downhole tool 200, in that the downhole tool 400 contemplates corrosive fluid only on the outside of the first member 210 and the second member 220. Accordingly, in the embodiment of FIG. 4, a crack compliant seal 440 is located radially outside of the high yield strength weld 450. In one or more embodiments, the crack compliant seal 440 is a crack compliant weld, as shown.

Figure 5:
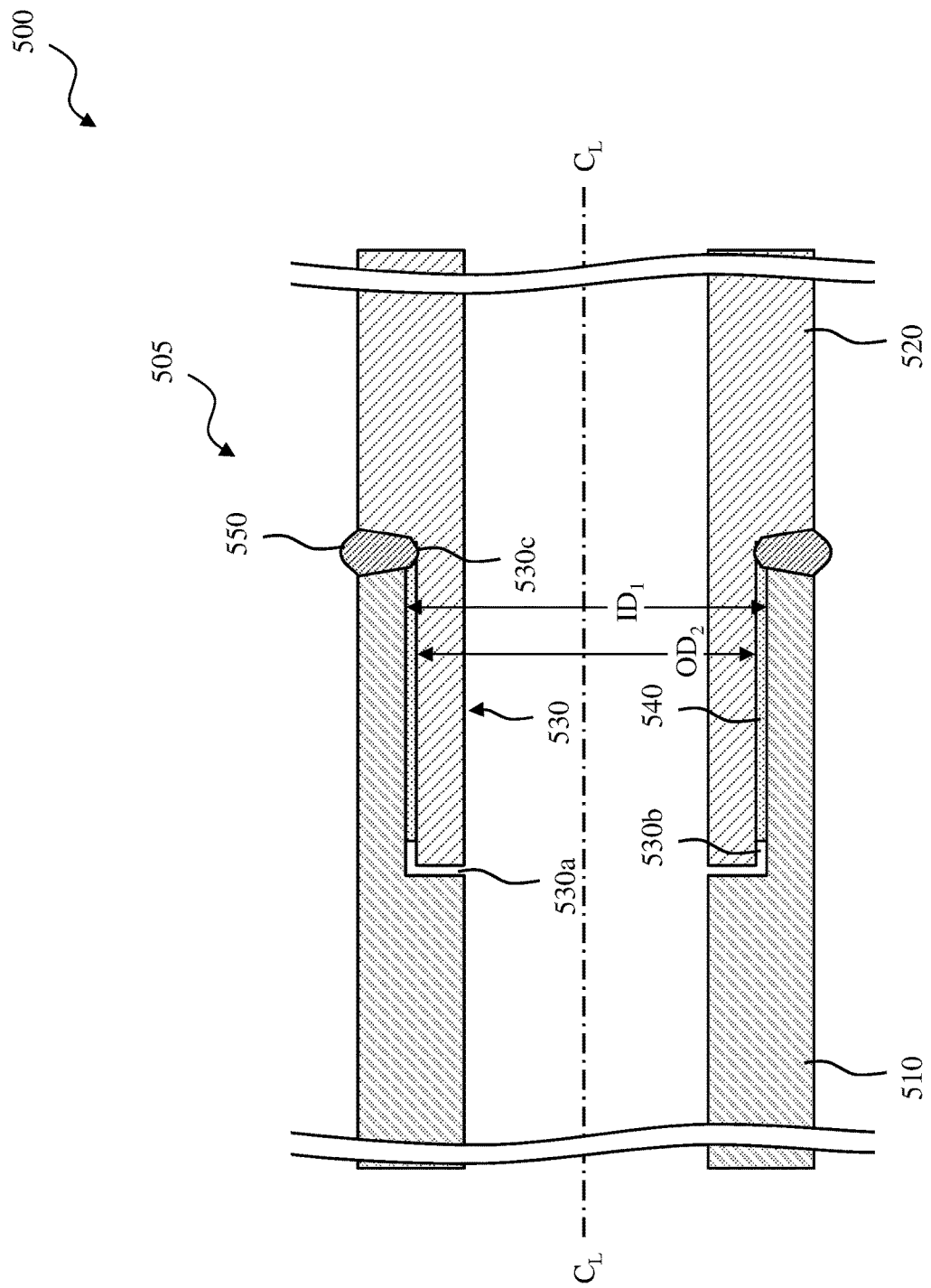

Turning to FIG. 5, depicted is a cross-sectional view of a downhole tool 500 including a junction 505 designed, manufactured and operated according to one or more alternative embodiments of the disclosure. The downhole tool 500 having the junction 505 is similar in many respects to the downhole tool 200 of FIG. 2. Accordingly, like reference numbers have been used to indicate similar, if not identical, features. The downhole tool 500 differs, for the most part, from the downhole tool 200, in that the second member outside diameter ($OD_2$) is less than the first member inside diameter ($ID_1$), the second member 520 having slid into the first member 510 to form an overlapping space (e.g., ultimately resulting in an overlapping joint). Further to the embodiment of FIG. 5, the downhole tool 500 employs a single stepped overlapping space 530. The single stepped overlapping space 530, in the illustrated embodiment, includes a radial interior radial extending portion 530$a$, an axial extending portion 530$b$, and a radial exterior radial extending portion 530$c$.

In the embodiment of FIG. 5, the crack compliant seal 540 is at least partially located within the axial extending portion 530$b$ of the overlapping space 530, and the high yield strength weld 550 is at least partially located within the radial exterior radial extending portion 530$c$ of the overlapping space 530. While not shown, the crack compliant seal 540 could also be located within at least a portion of the radial interior radial extending portion 530$a$, or alternatively or in addition to, within at least a portion of the radial exterior radial extending portion 530$c$.

Figure 6:
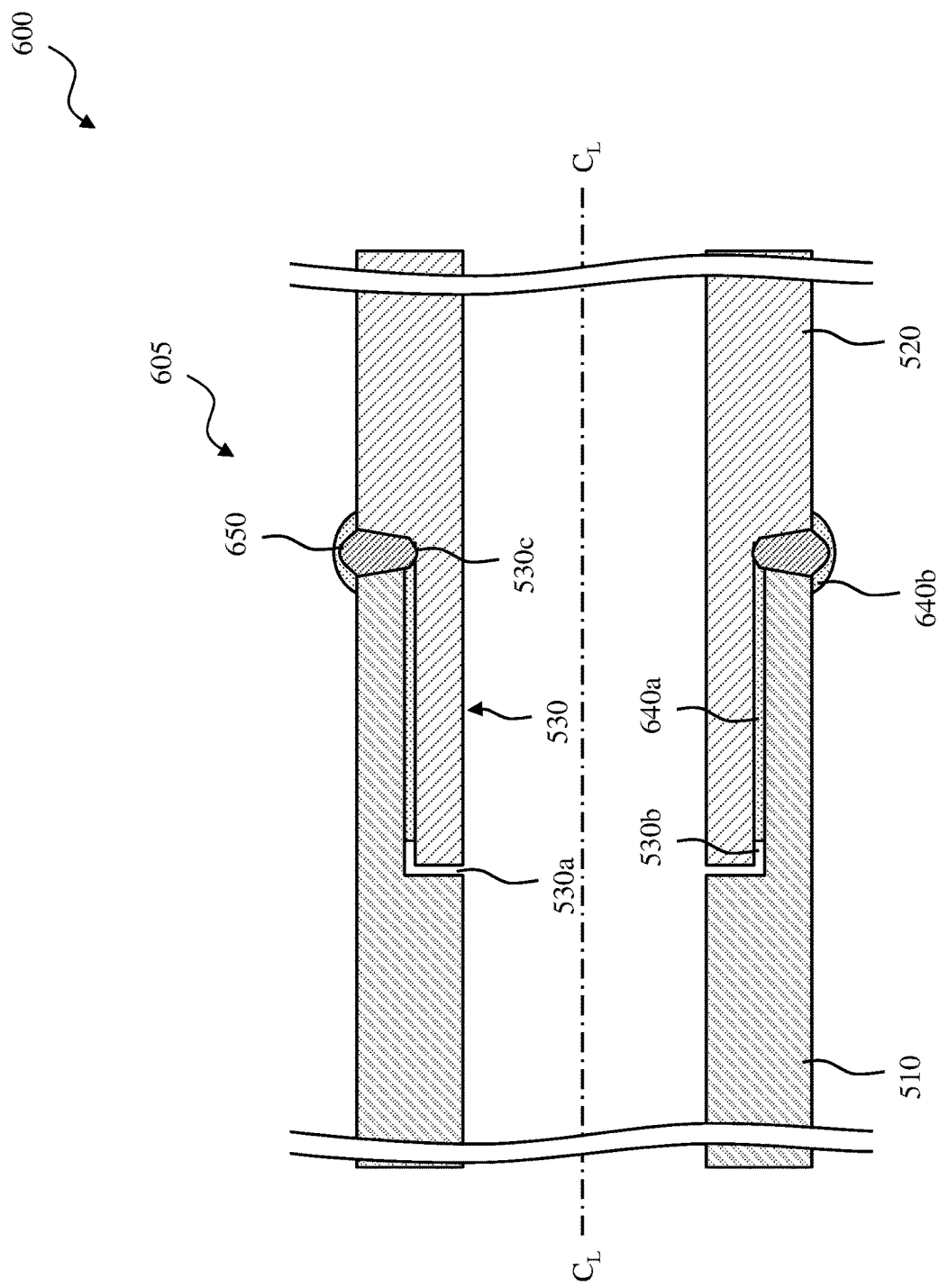

Turning to FIG. 6, depicted is a cross-sectional view of a downhole tool 600 including a junction 605 designed, manufactured and operated according to one or more alternative embodiments of the disclosure. The downhole tool 600 having the junction 605 is similar in many respects to the downhole tool 500 of FIG. 5. Accordingly, like reference numbers have been used to indicate similar, if not identical, features. The downhole tool 600 differs, for the most part, from the downhole tool 500, in that the downhole tool 600 contemplates corrosive fluid both inside the first member 510 and the second member 520 and outside of the first member 510 and the second member 520. Accordingly, a sandwich of a first crack compliant seal 640$a$, a high yield strength weld 650, and a second crack compliant seal 640$b$ (e.g., crack compliant weld) is employed.

Figure 7:
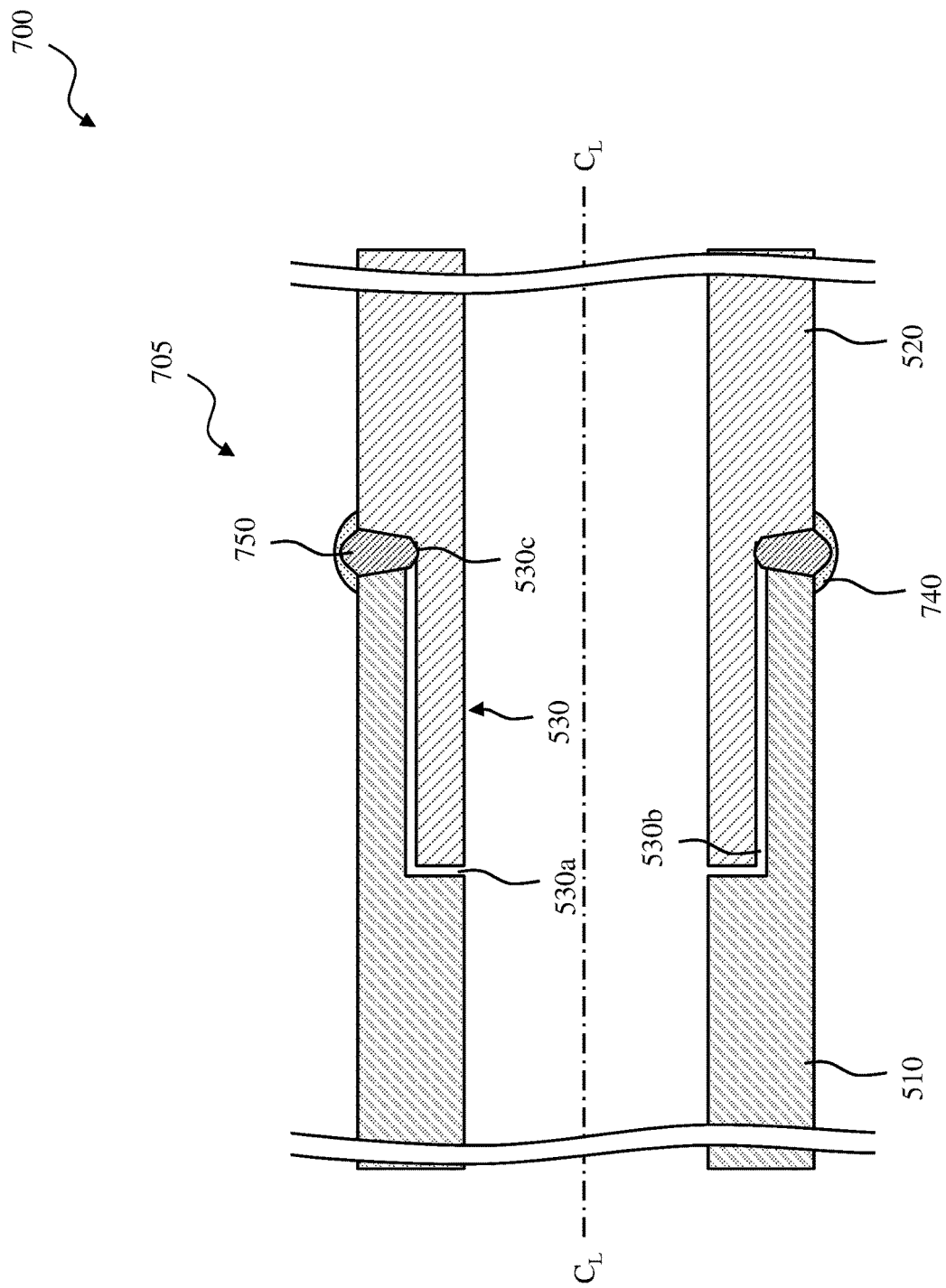

Turning to FIG. 7, depicted is a cross-sectional view of a downhole tool 700 including a junction 705 designed, manufactured and operated according to one or more alternative embodiments of the disclosure. The downhole tool 700 having the junction 705 is similar in many respects to the downhole tool 500 of FIG. 5. Accordingly, like reference numbers have been used to indicate similar, if not identical, features. The downhole tool 700 differs, for the most part, from the downhole tool 500, in that the downhole tool 700 contemplates corrosive fluid only on the outside of the first member 510 and the second member 520. Accordingly, in the embodiment of FIG. 7, a crack compliant seal 740 is located radially outside of the high yield strength weld 750. In one or more embodiments, the crack compliant seal 740 is a crack compliant weld, as shown.

Figure 8A:
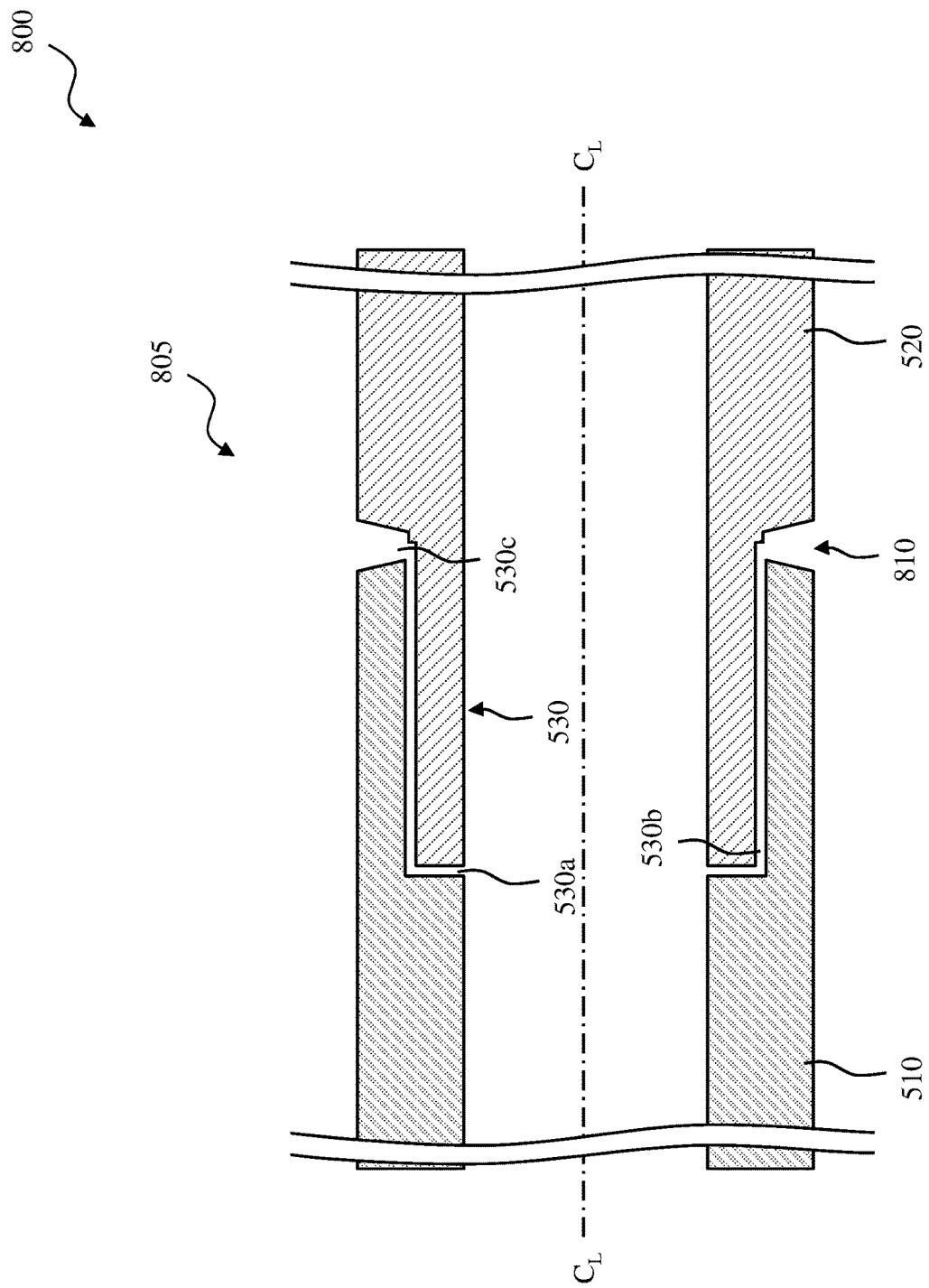
Figure 8B:
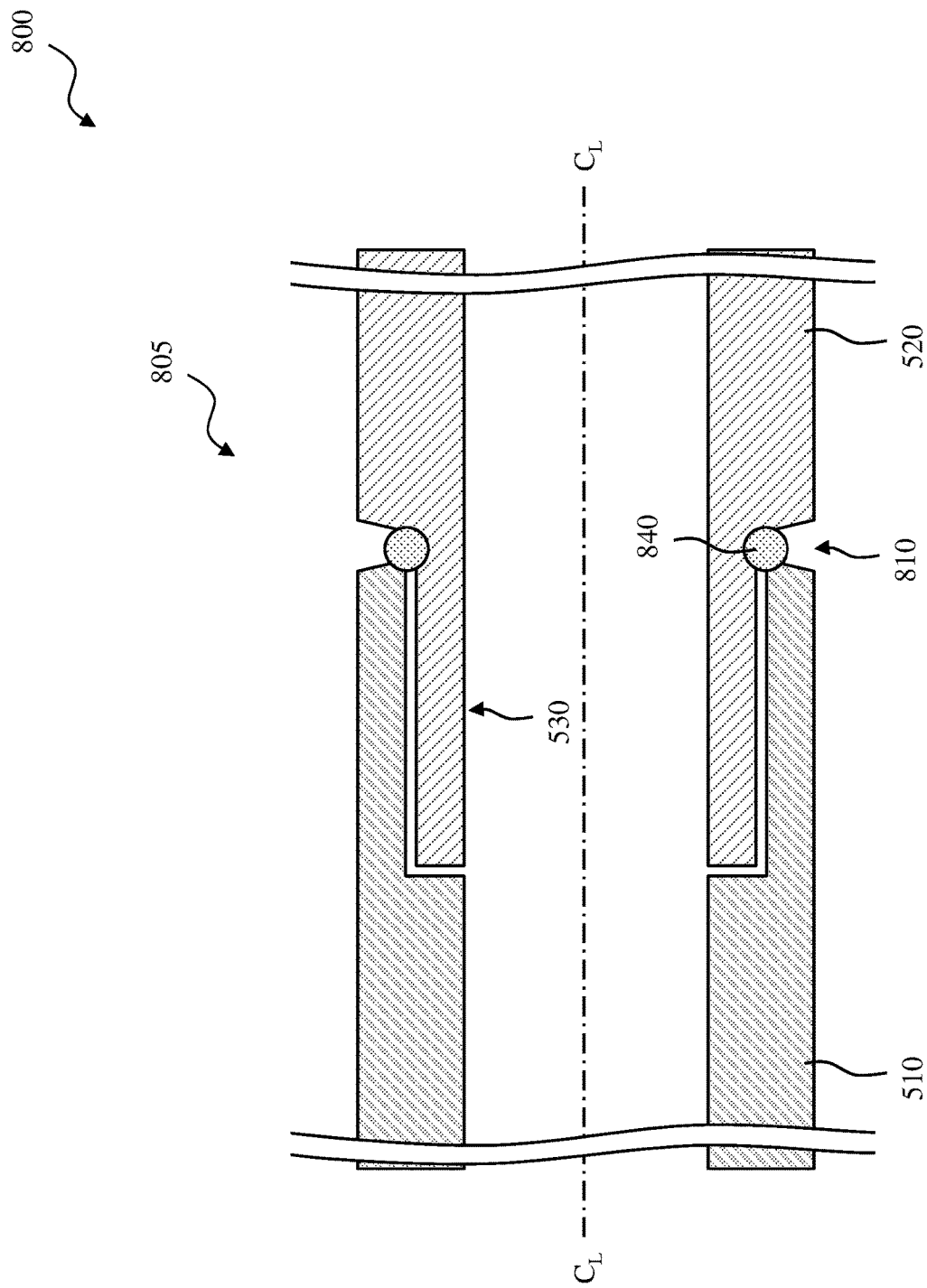
Figure 8C:
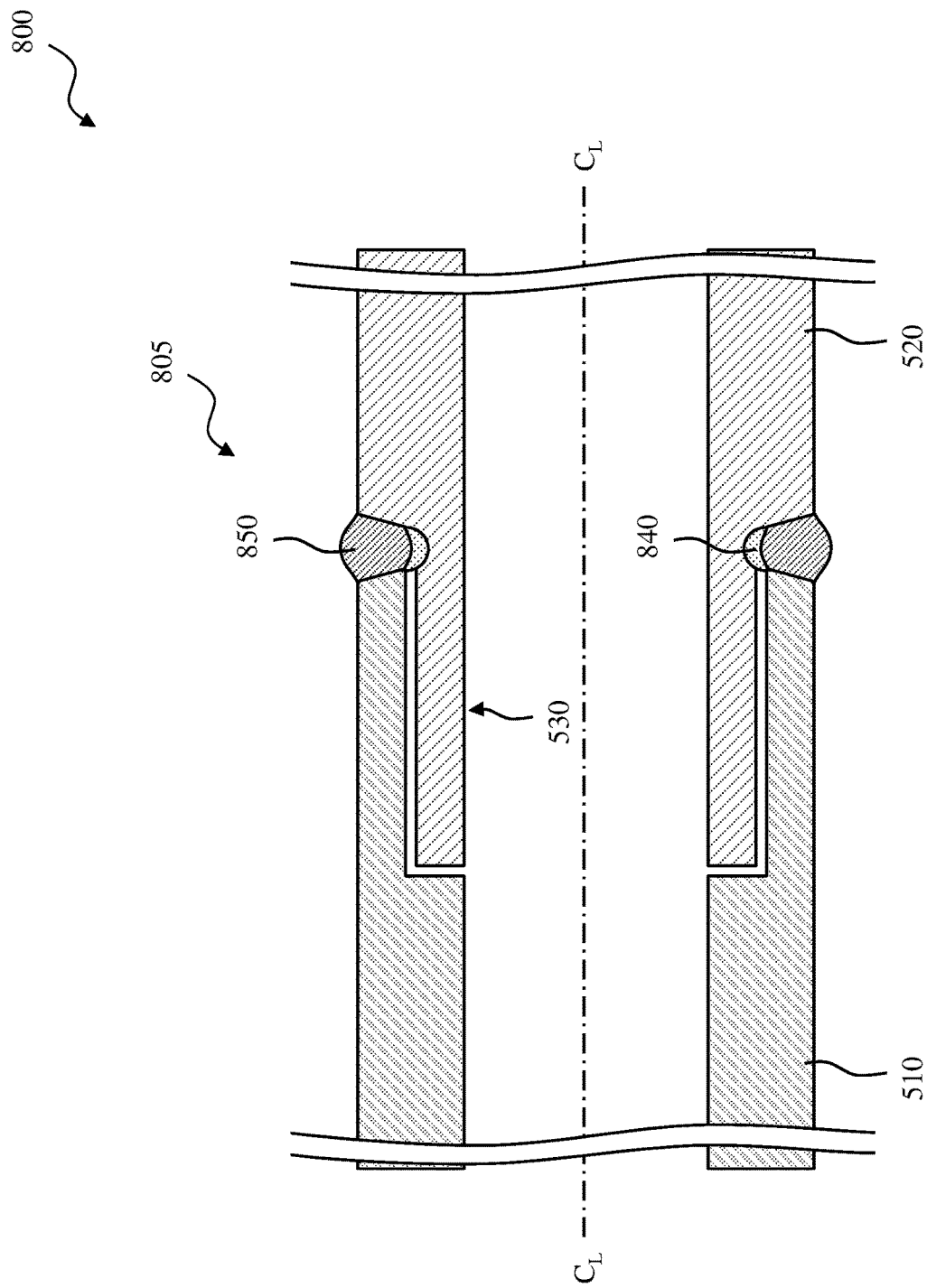

Turning to FIGS. 8A through 8C, depicted are cross-sectional views of a downhole tool 800 including a junction 805 designed, manufactured and operated according to one or more alternative embodiments of the disclosure at different stages of manufacture. The downhole tool 800 having the junction 805 is similar in many respects to the downhole tool 500 of FIG. 5. Accordingly, like reference numbers have been used to indicate similar, if not identical, features. The downhole tool 800 differs, for the most part, from the downhole tool 500, in that the downhole tool 800 includes a radially exterior notched overlapping junction. For example, each of the first member 510 and the second member 530 could have angled surfaces forming the notch 810. It should be noted that the notch 810 may exist as a function of the original shapes of the first member 510 and the second member 520, or may be formed (e.g., cut, ground, etc.) from the first member 510 and the second member 520 after their initial joinder.

Further to the embodiment of FIGS. 8A through 8C, a crack compliant weld 840 may be first formed (e.g., deposited) in the notch 810, followed by the forming of the high yield string weld 850 (e.g., at least partially within the notch 810), as shown in FIGS. 8B and 8C. In the illustrated embodiment, the crack compliant weld 840 is located radially inside of the high yield strength weld 850, as might be desired/required if the corrosive fluid were located inside of the first member 510 and the second member 520.

Figure 9:
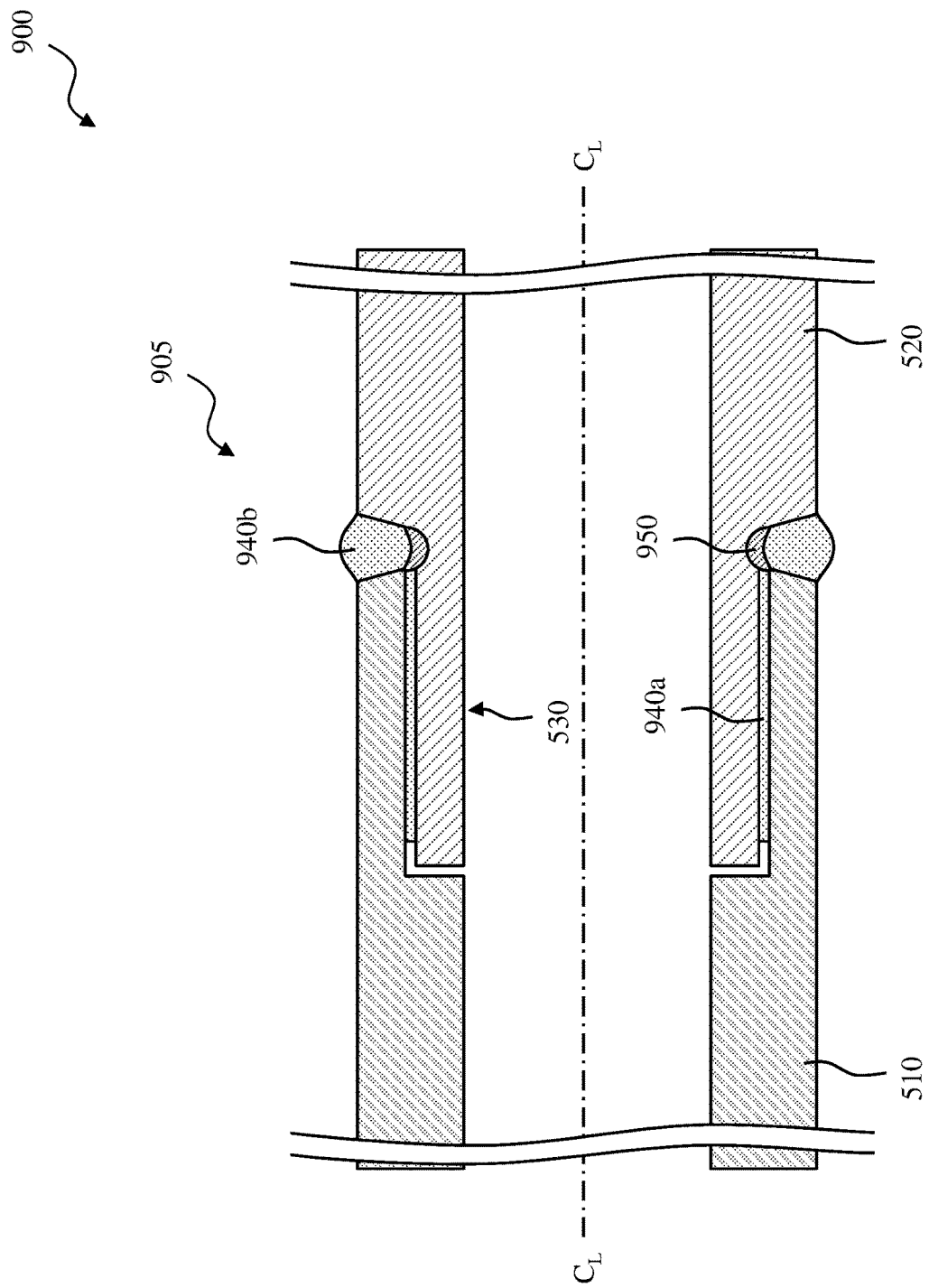

Turning to FIG. 9, depicted is a cross-sectional view of a downhole tool 900 including a junction 905 designed, manufactured and operated according to one or more alternative embodiments of the disclosure. The downhole tool 900 having the junction 905 is similar in many respects to the downhole tool 800 of FIG. 8. Accordingly, like reference numbers have been used to indicate similar, if not identical, features. The downhole tool 900 differs, for the most part, from the downhole tool 800, in that the downhole tool 900 contemplates corrosive fluid both inside the first member 510 and the second member 520 and outside of the first member 510 and the second member 520. Accordingly, a sandwich of a first crack compliant seal 940a, a high yield strength weld 950, and a second crack compliant weld 940b is employed.

Figure 10:
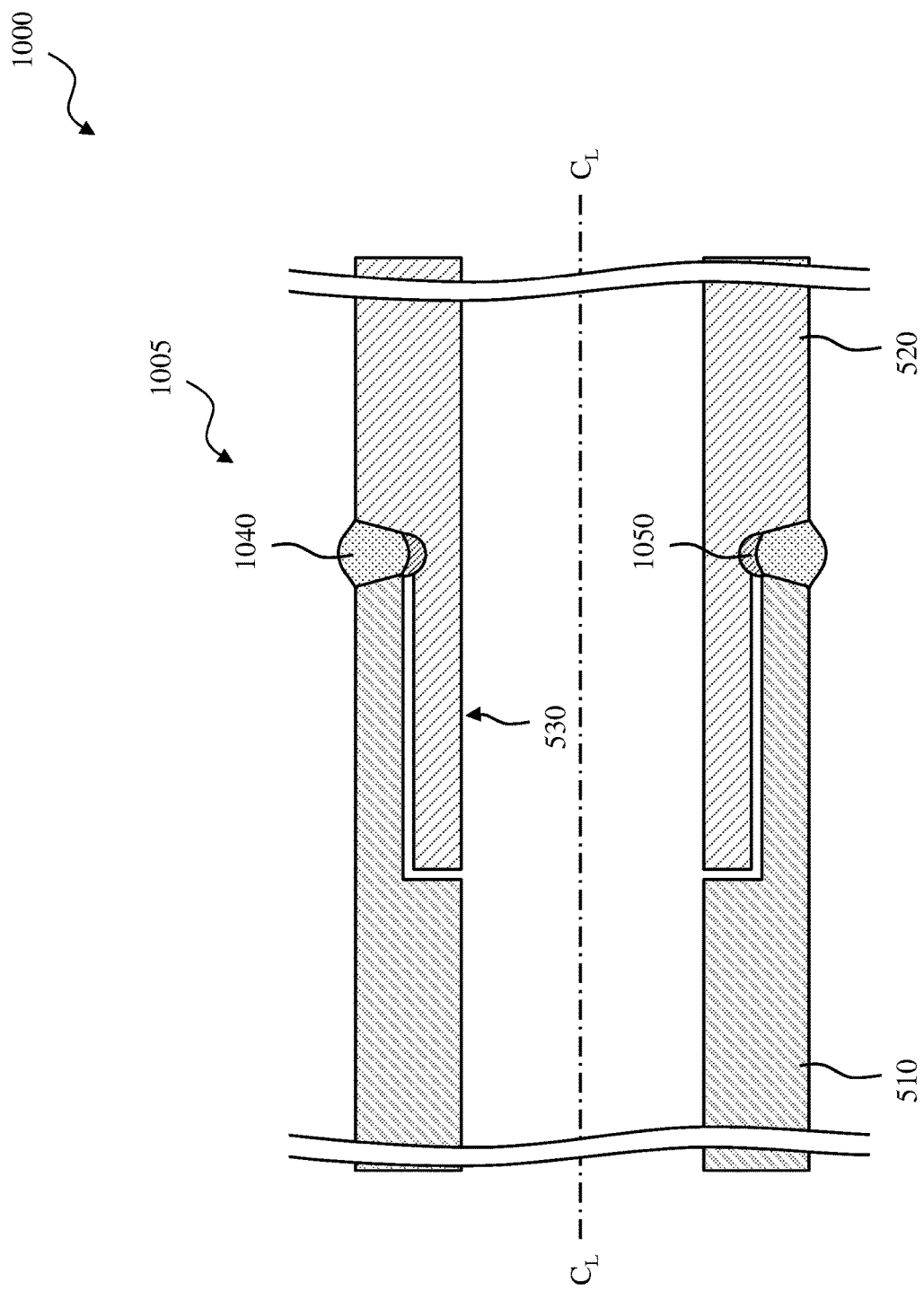

Turning to FIG. 10, depicted is a cross-sectional view of a downhole tool 1000 including a junction 1005 designed, manufactured and operated according to one or more alternative embodiments of the disclosure. The downhole tool 1000 having the junction 1005 is similar in many respects to the downhole tool 800 of FIG. 8. Accordingly, like reference numbers have been used to indicate similar, if not identical, features. The downhole tool 1000 differs, for the most part, from the downhole tool 800, in that the downhole tool 1000 contemplates corrosive fluid only on the outside of the first member 510 and the second member 520. Accordingly, in the embodiment of FIG. 10, a crack compliant seal 1040 is located radially outside of the high yield strength weld 1050. In one or more embodiments, the crack compliant seal 1040 is a crack compliant weld 1050, as shown.

Figure 11:
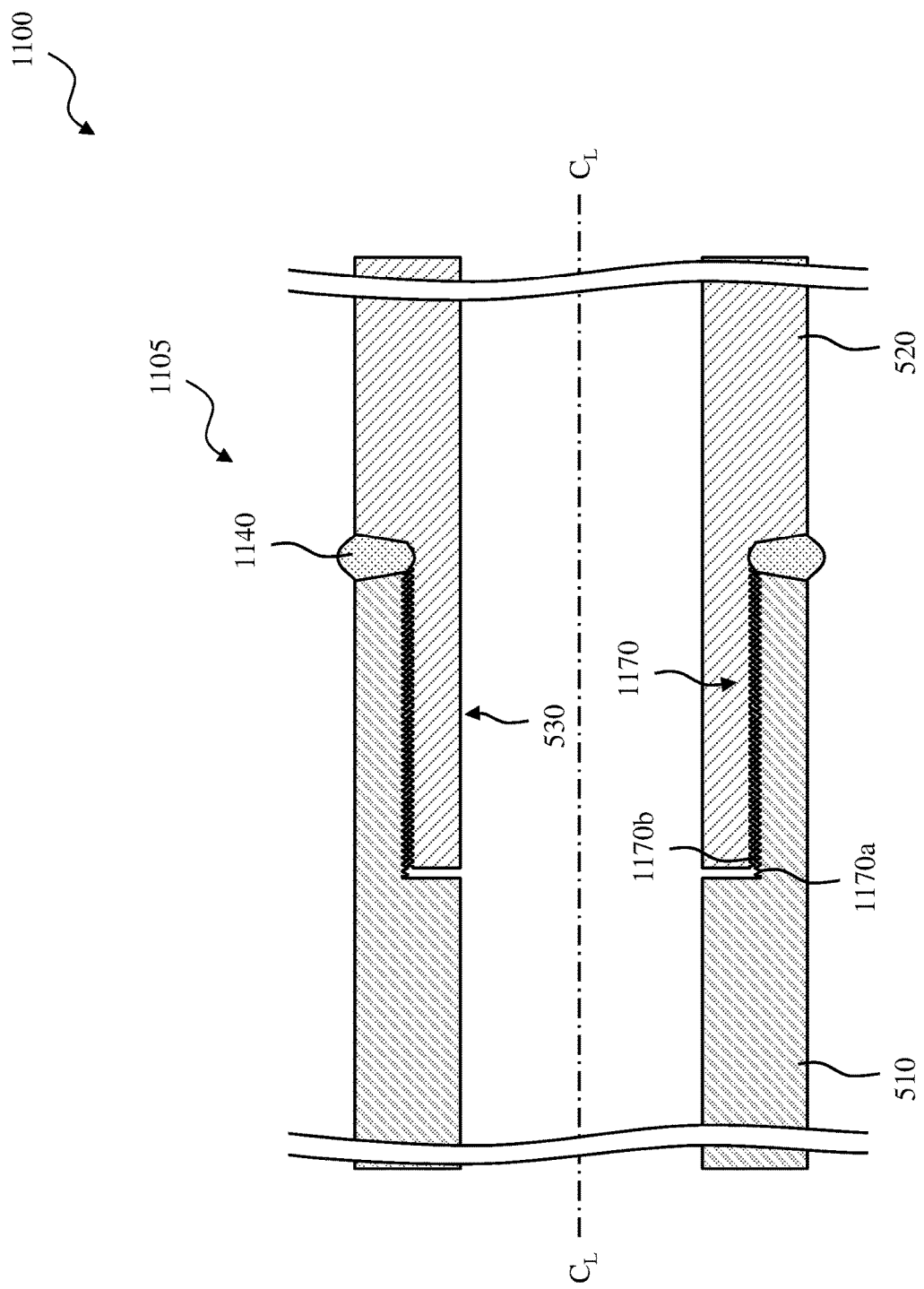

Turning to FIG. 11, depicted is a cross-sectional view of a downhole tool 1100 including a junction 1105 designed, manufactured and operated according to one or more alternative embodiments of the disclosure. The downhole tool 1100 having the junction 1105 is similar in many respects to the downhole tool 800 of FIG. 8. Accordingly, like reference numbers have been used to indicate similar, if not identical, features. The downhole tool 1100 differs, for the most part, from the downhole tool 800, in that the downhole tool 1100 includes a geometric mechanical strengthening feature 1170 located between the first member 510 and the second member 520. The geometric mechanical strengthening feature 1170, in the disclosed embodiment, is configured to increase an engineering rating (e.g., as defined above) of the overlapping space 530, and thus the joint. For instance, in certain embodiments, the geometric mechanical strengthening feature 1170 may provide the necessary yield strength for the downhole tool 1100, such that the high yield strength weld may not be necessary.

Many different geometric mechanical strengthening features may be used and remain within the scope of the disclosure. Nevertheless, in the embodiment of FIG. 11, the geometric mechanical strengthening feature 1170 is a first set of threads 1170a in the first member inside diameter ($ID_1$) and a second set of threads 1170b in the second member outside diameter ($OD_2$). In this embodiment, the collection of the first set of threads 1170a and the second set of threads 1170b provides the requisite yield strength for the joint. Further to the embodiment of FIG. 11, a crack compliant seal 1140 is positioned at the overlapping space 530. Further to the embodiment of FIG. 11, the crack compliant seal 1140 may be a crack compliant weld.

Figure 12:
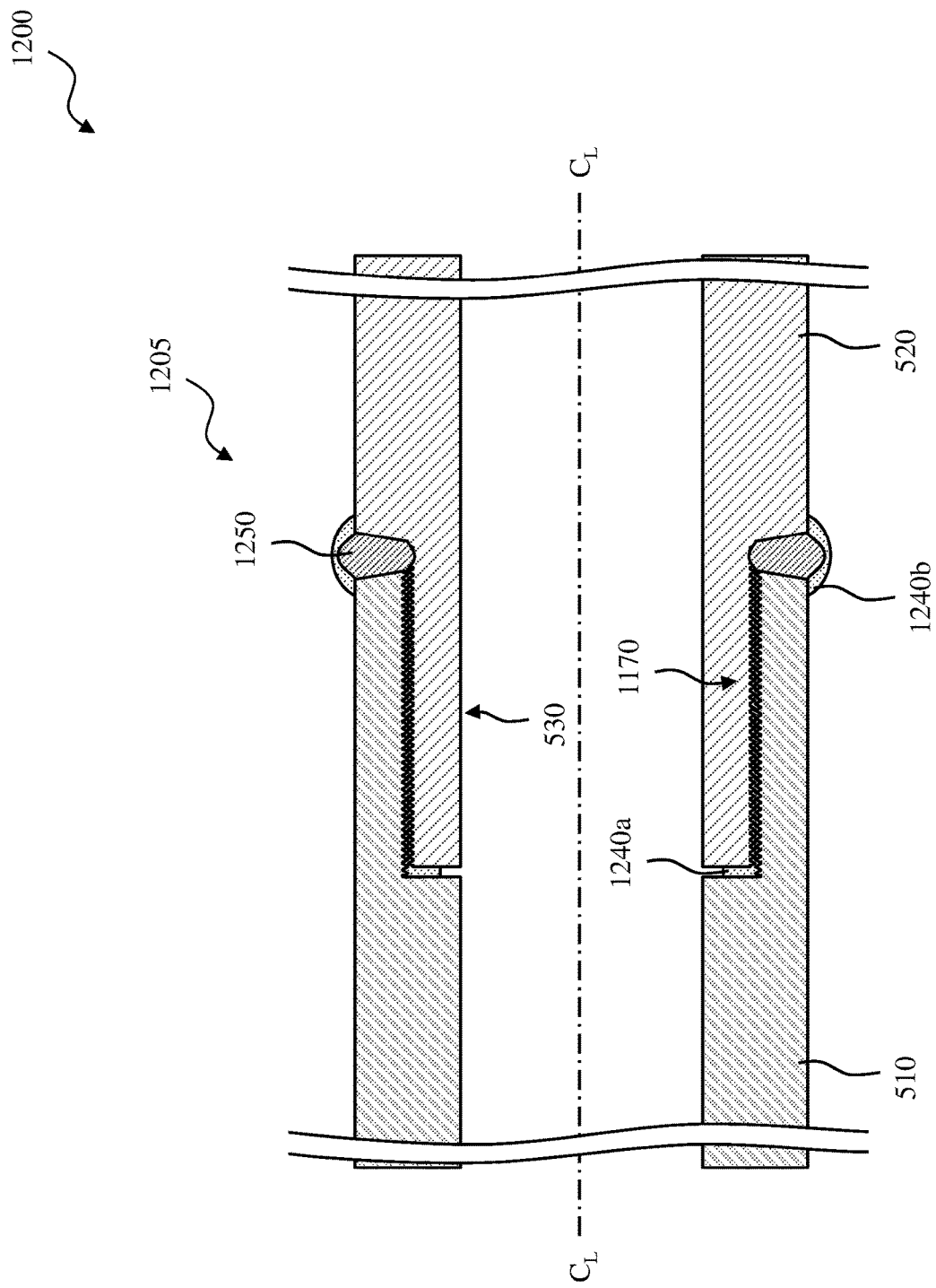

Turning to FIG. 12, depicted is a cross-sectional view of a downhole tool 1200 including a junction 1205 designed, manufactured and operated according to one or more alternative embodiments of the disclosure. The downhole tool 1200 having the junction 1205 is similar in many respects to the downhole tool 1100 of FIG. 11. Accordingly, like reference numbers have been used to indicate similar, if not identical, features. The downhole tool 1200 differs, for the most part, from the downhole tool 1100, in that the downhole tool 1200 contemplates corrosive fluid both inside the first member 510 and the second member 520 and outside of the first member 510 and the second member 520. Accordingly, a sandwich of a first crack compliant seal 1240a, a high yield strength weld 1250, and a second crack compliant weld 1240b is employed. The first crack compliant seal 1240 may be located within an axial extending portion of the overlapping joint, located between the first set of threads and the second set of threads, or located within a radial extending portion of the overlapping joint, depending on the design of the downhole tool 1200.

Figure 13:
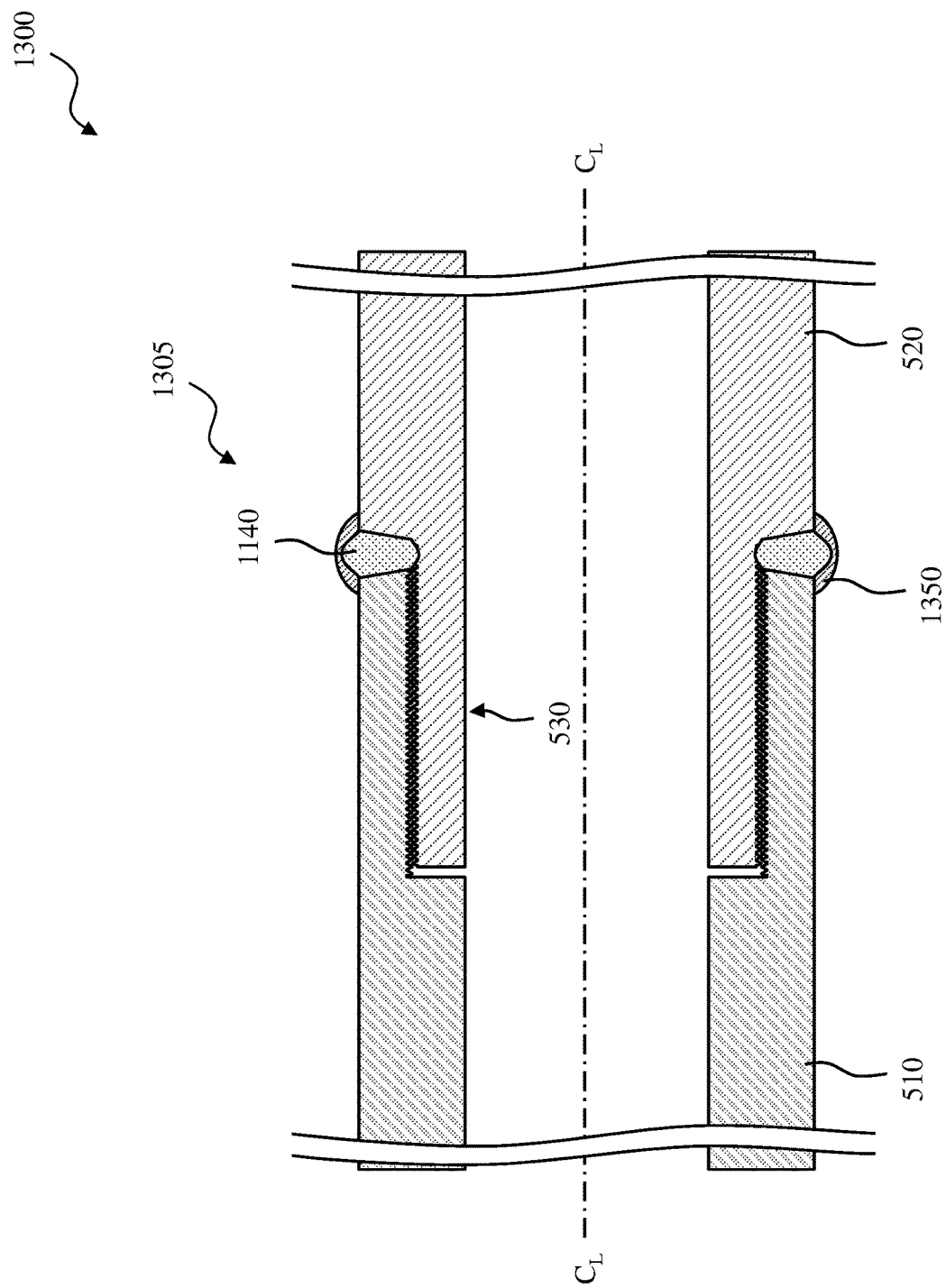

Turning to FIG. 13, depicted is a cross-sectional view of a downhole tool 1300 including a junction 1305 designed, manufactured and operated according to one or more alternative embodiments of the disclosure. The downhole tool 1300 having the junction 1305 is similar in many respects to the downhole tool 1100 of FIG. 11. Accordingly, like reference numbers have been used to indicate similar, if not identical, features. The downhole tool 1300 differs, for the most part, from the downhole tool 1100, in that the downhole tool 1300 further includes a high yield strength weld 1350 positioned at the overlapping space 530. In the illustrated embodiment, the crack compliant seal 1140 is located radially inside of the high yield strength weld 1350, the high yield strength weld 1350 providing additional burst and/or collapse support. The location of the crack compliant seal 1140 is, at least in part, based upon the corrosive fluid being location on an inside of the of the first member 510 and the second member 520.

Figure 14:
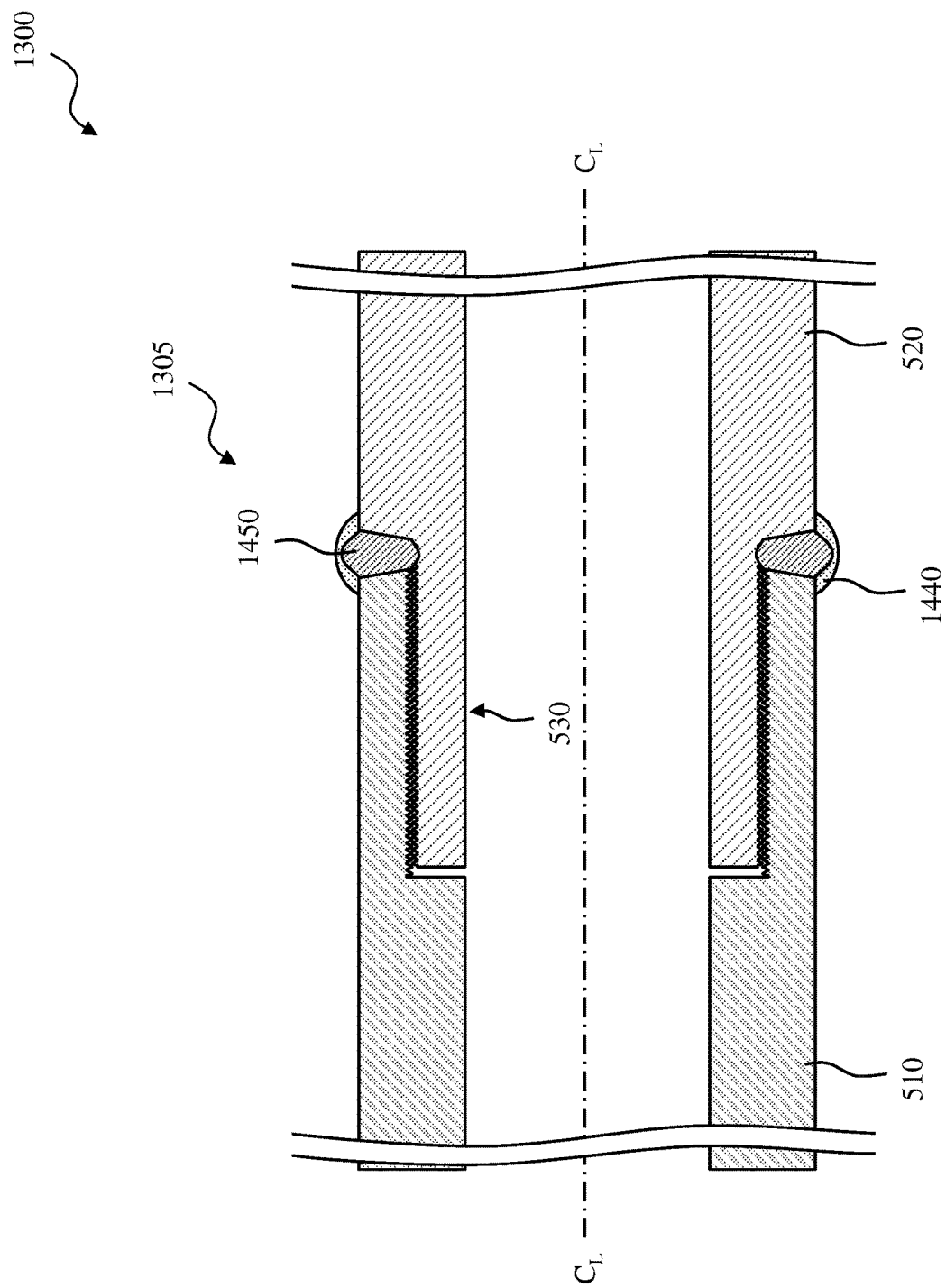

Turning to FIG. 14, depicted is a cross-sectional view of a downhole tool 1400 including a junction 1405 designed, manufactured and operated according to one or more alternative embodiments of the disclosure. The downhole tool 1400 having the junction 1405 is similar in many respects to the downhole tool 1100 of FIG. 11. Accordingly, like reference numbers have been used to indicate similar, if not identical, features. The downhole tool 1400 differs, for the most part, from the downhole tool 1100, in that the downhole tool 1400 further includes a high yield strength weld 1450 positioned at the overlapping space 530. In the illustrated embodiment, the crack compliant seal 1440 is located radially outside of the high yield strength weld 1450, the high yield strength weld 1450 providing additional burst and/or collapse support. The location of the crack compliant seal 1440 is, at least in part, based upon the corrosive fluid being location on an outside of the of the first member 510 and the second member 520.

Figure 15:
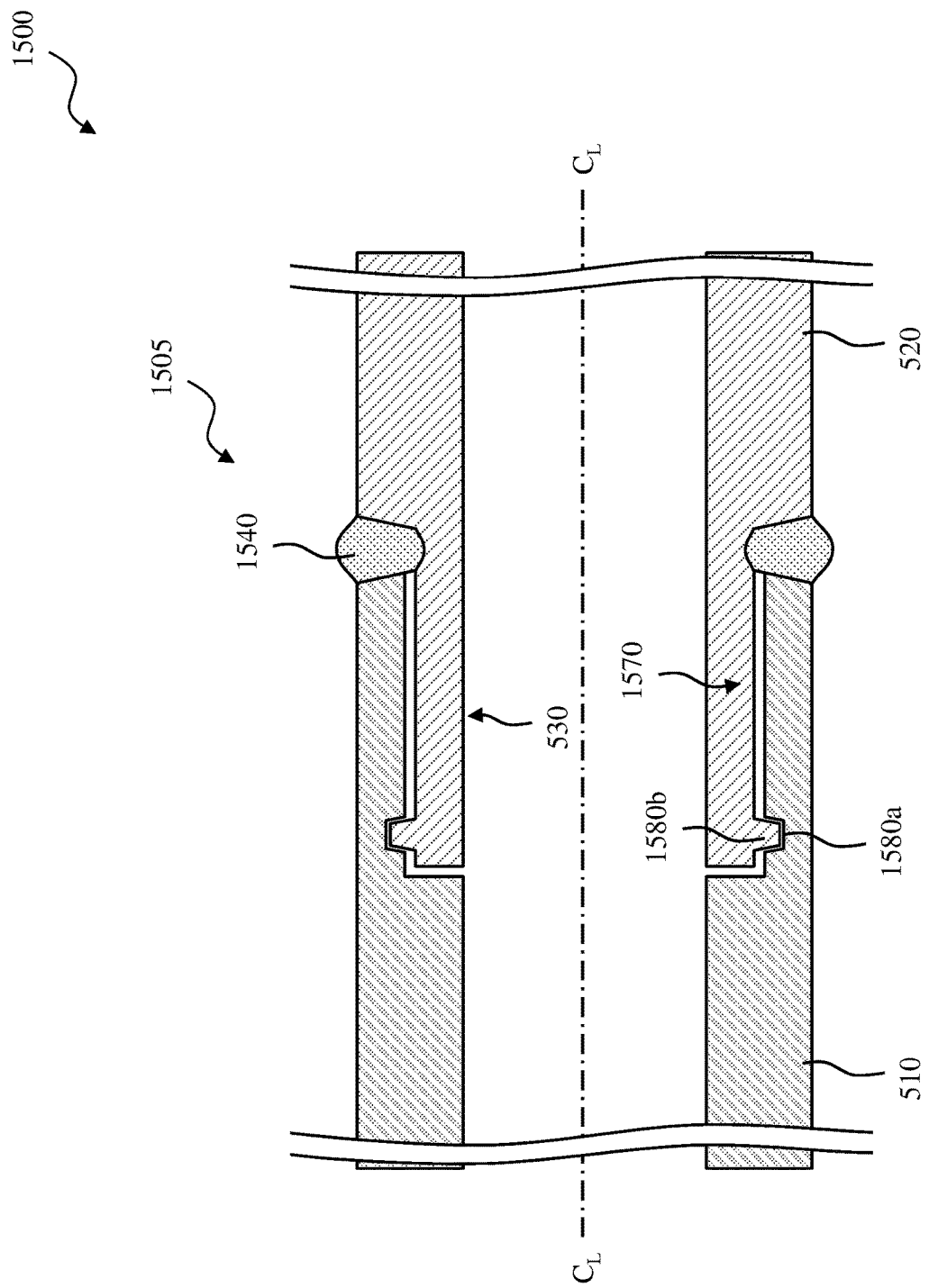

Turning to FIG. 15, depicted is a cross-sectional view of a downhole tool 1500 including a junction 1505 designed, manufactured and operated according to one or more alternative embodiments of the disclosure. The downhole tool 1500 having the junction 1505 is similar in many respects to the downhole tool 800 of FIG. 8. Accordingly, like reference numbers have been used to indicate similar, if not identical, features. The downhole tool 1500 differs, for the most part, from the downhole tool 800, in that the downhole tool 1500 includes a geometric mechanical strengthening feature 1570 located between the first member 510 and the second member 520. The geometric mechanical strengthening feature 1570, in the disclosed embodiment, is configured to increase an engineering rating (e.g., as defined above) of the overlapping space 530. For instance, in certain embodiments, the geometric mechanical strengthening feature 1570 may provide the necessary yield strength for the downhole tool such that the high yield strength weld may not be necessary.

Many different geometric mechanical strengthening features may be used and remain within the scope of the disclosure, including collets, lock rings, snap rings, etc. Nevertheless, in the embodiment of FIG. 15, the geometric mechanical strengthening feature 1570 is a collet feature in one of the first member 510 or the second member 520. Further to the embodiment of FIG. 15, the collet feature may include a collet finger profile 1580a in one of the first member 510 or the second member 520 and a collet finger 1580b in an other of the second member 520 or the first member 510. In the illustrated embodiment of FIG. 15, the collet finger profile 1580b is located in the first member 510, whereas the collet finger 1580b is located in the second member 520. Nevertheless, the opposite could hold true.

Further to the embodiment of FIG. 15, a crack compliant seal 1540 is positioned at the overlapping space 530. Further to the embodiment of FIG. 15, the crack compliant seal 1540 may be a crack compliant weld.

Figure 16:
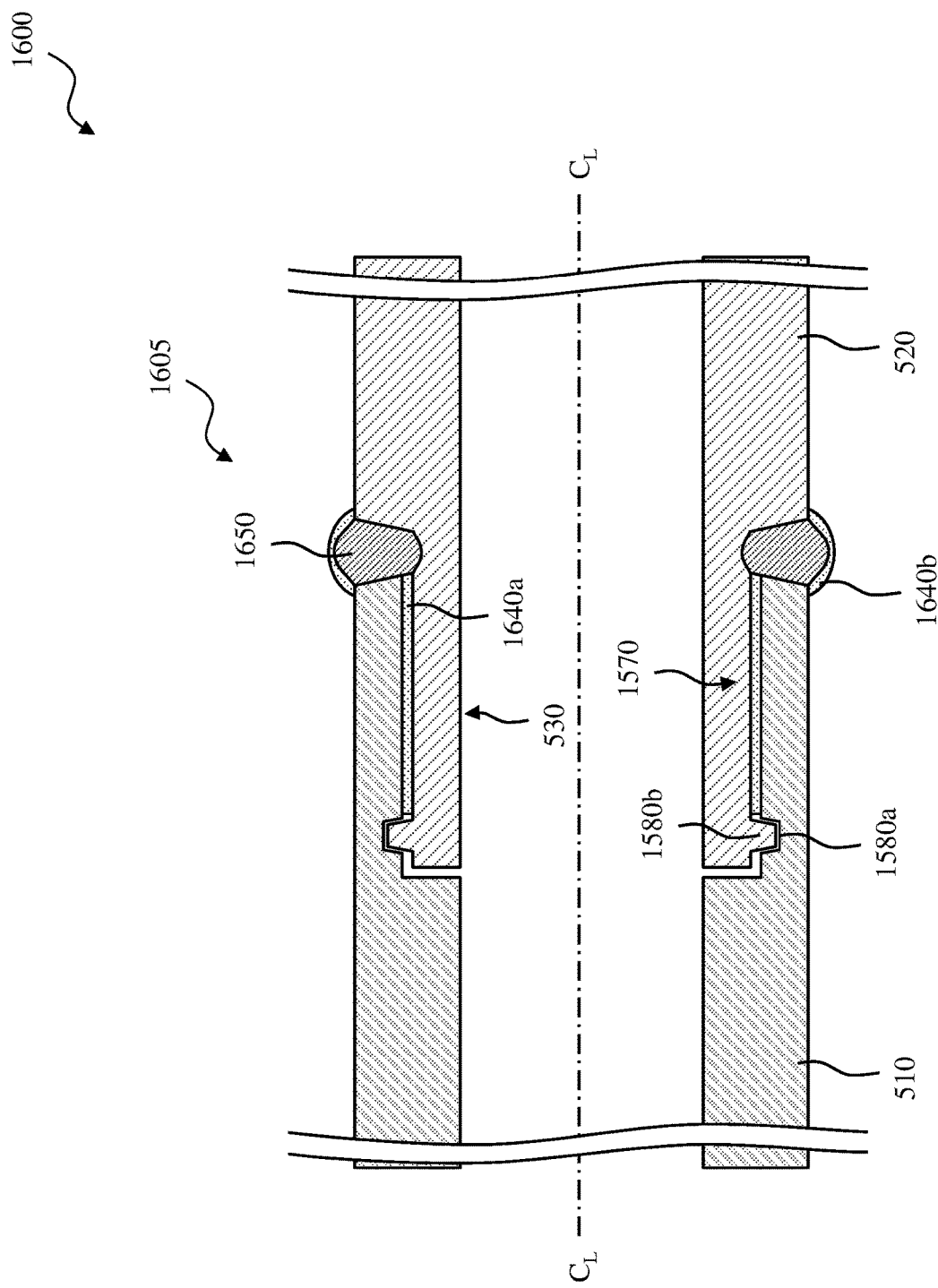

Turning to FIG. 16, depicted is a cross-sectional view of a downhole tool 1600 including a junction 1605 designed, manufactured and operated according to one or more alternative embodiments of the disclosure. The downhole tool 1600 having the junction 1605 is similar in many respects to the downhole tool 1500 of FIG. 15. Accordingly, like reference numbers have been used to indicate similar, if not identical, features. The downhole tool 1600 differs, for the most part, from the downhole tool 1500, in that the downhole tool 1600 contemplates corrosive fluid both inside the first member 510 and the second member 520 and outside of the first member 510 and the second member 520. Accordingly, a sandwich of a first crack compliant seal 1640a, a high yield strength weld 1650, and a second crack compliant weld 1640b is employed.

Figure 17:
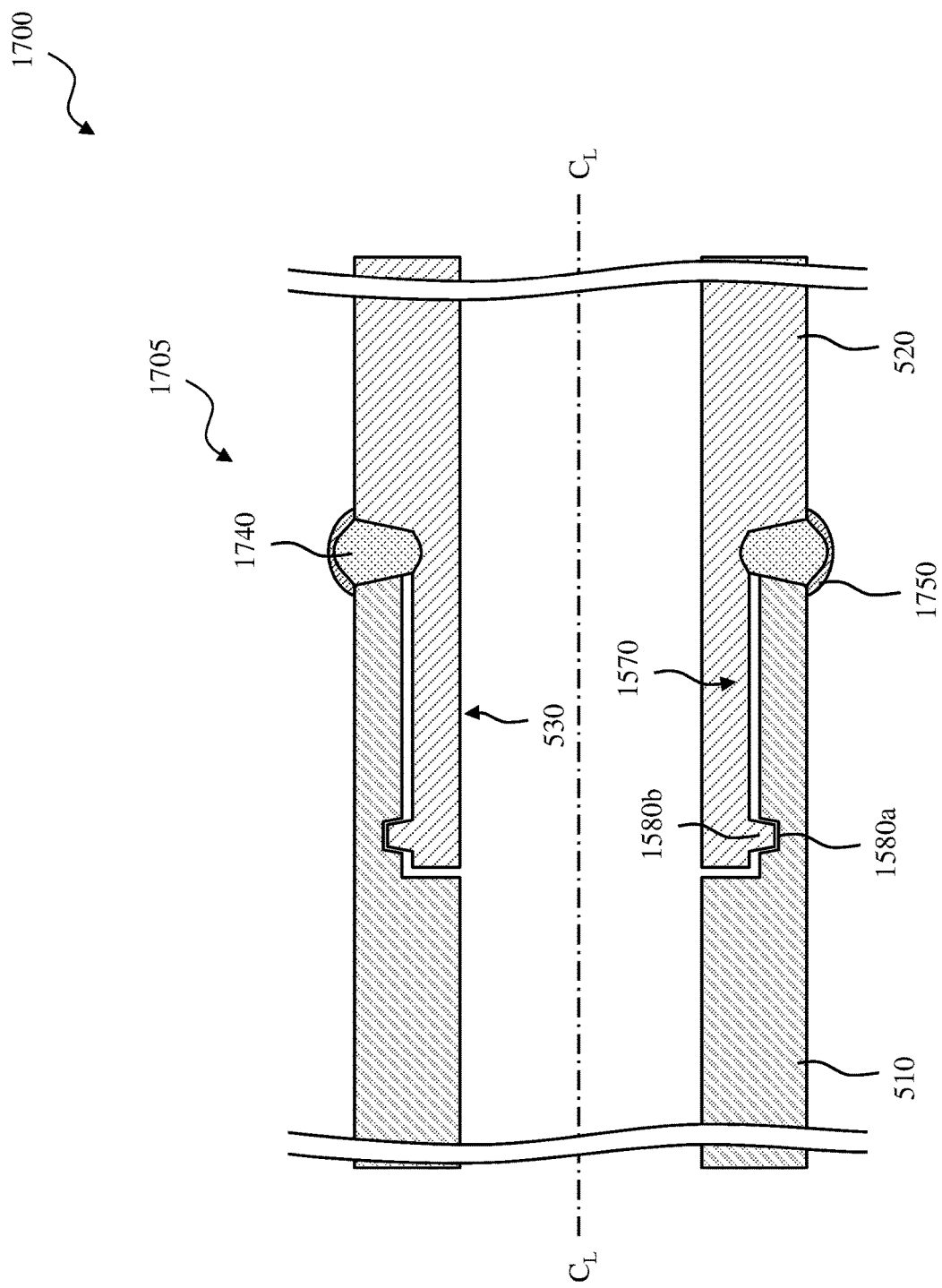

Turning to FIG. 17, depicted is a cross-sectional view of a downhole tool 1700 including a junction 1705 designed, manufactured and operated according to one or more alternative embodiments of the disclosure. The downhole tool 1700 having the junction 1705 is similar in many respects to the downhole tool 1500 of FIG. 15. Accordingly, like reference numbers have been used to indicate similar, if not identical, features. The downhole tool 1700 differs, for the most part, from the downhole tool 1500, in that the downhole tool 1700 further includes a high yield strength weld 1750 positioned at the overlapping space 530. In the illustrated embodiment, the crack compliant seal 1740 is located radially inside of the high yield strength weld 1750, the high yield strength weld 1750 providing additional burst and/or collapse support. The location of the crack compliant seal 1740 is, at least in part, based upon the corrosive fluid being location on an inside of the of the first member 510 and the second member 520.

Figure 18:
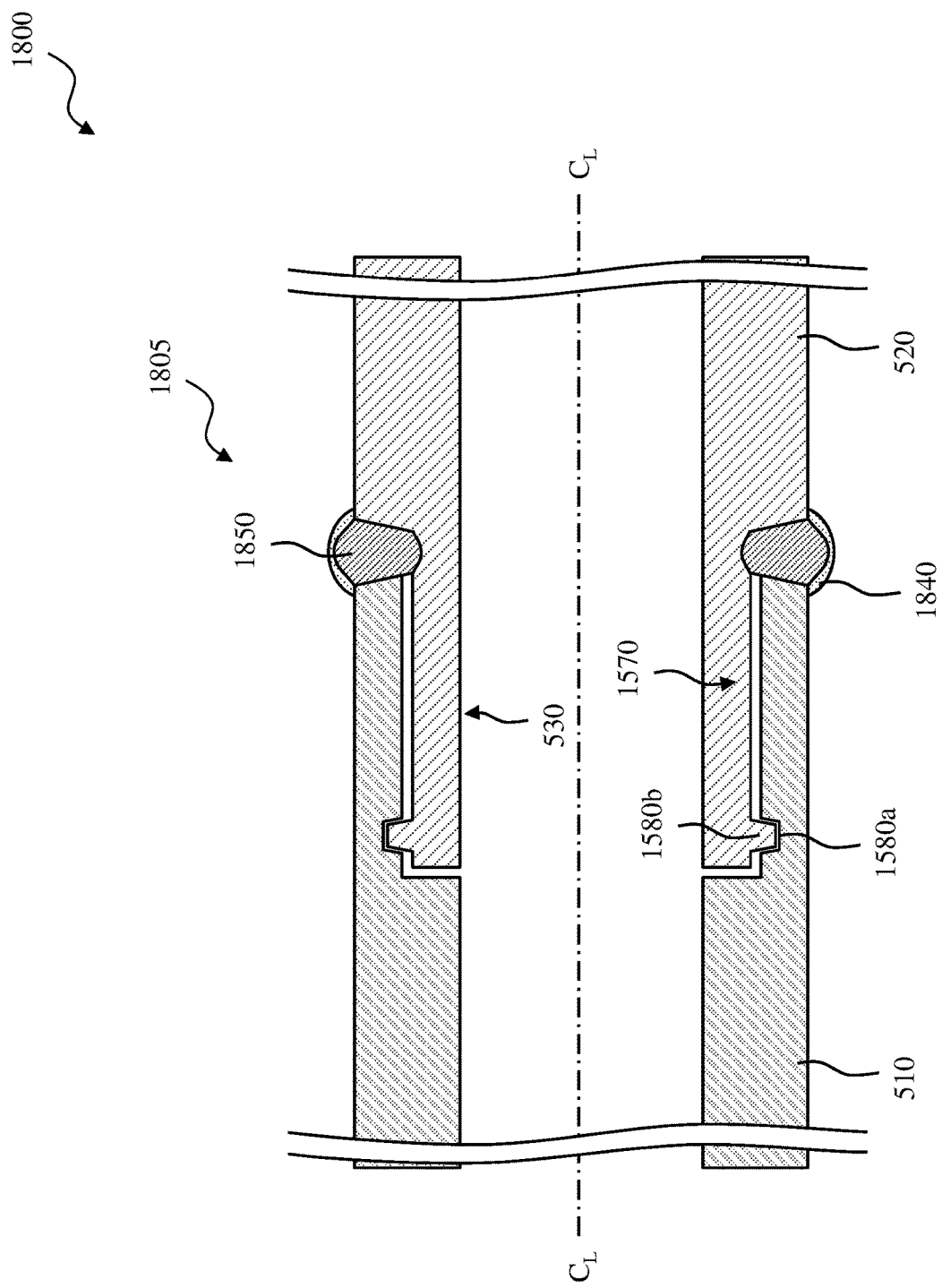

Turning to FIG. 18, depicted is a cross-sectional view of a downhole tool 1800 including a junction 1805 designed, manufactured and operated according to one or more alternative embodiments of the disclosure. The downhole tool 1800 having the junction 1805 is similar in many respects to the downhole tool 1500 of FIG. 15. Accordingly, like reference numbers have been used to indicate similar, if not identical, features. The downhole tool 1800 differs, for the most part, from the downhole tool 1500, in that the downhole tool 1800 further includes a high yield strength weld 1850 positioned at the overlapping space 530. In the illustrated embodiment, the crack compliant seal 1840 is located radially outside of the high yield strength weld 1850, the high yield strength weld 1850 providing additional burst and/or collapse support. The location of the crack compliant seal 1840 is, at least in part, based upon the corrosive fluid being location on an outside of the of the first member 510 and the second member 520.

Figure 19:
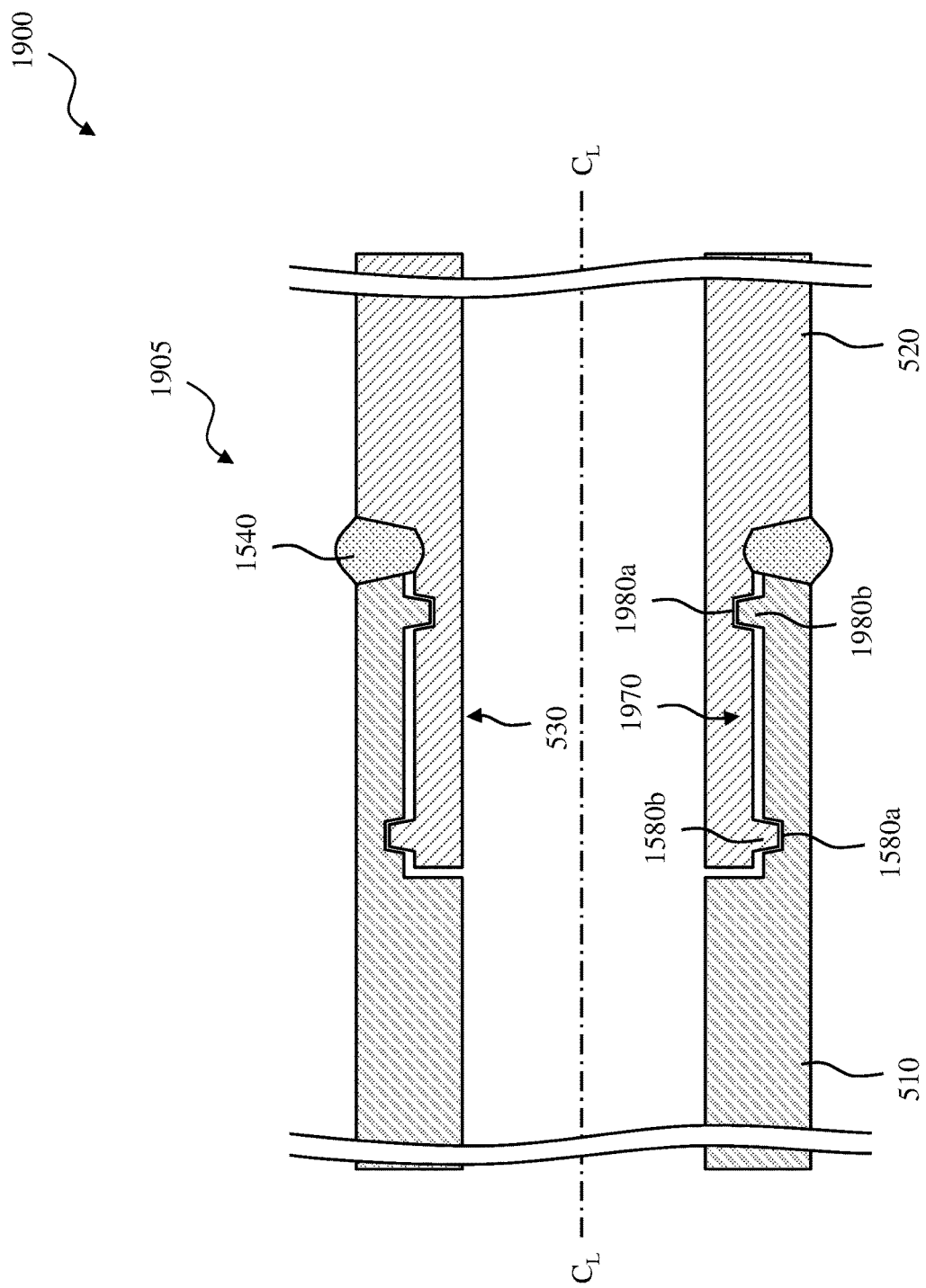

Turning to FIG. 19, depicted is a cross-sectional view of a downhole tool 1900 including a junction 1905 designed, manufactured and operated according to one or more alternative embodiments of the disclosure. The downhole tool 1900 having the junction 1905 is similar in many respects to the downhole tool 1500 of FIG. 15. Accordingly, like reference numbers have been used to indicate similar, if not identical, features. The downhole tool 1900 differs, for the most part, from the downhole tool 1500, in that the downhole tool 1900 further includes a geometric mechanical strengthening feature 1970 including a second set of collet finger profiles 1980a and collet fingers 1980b. In one or more embodiments, the second set of collet finger profiles 1980a and collet fingers 1980b provide additional burst/collapse strength. a high yield strength weld 1850 positioned at the overlapping space 530.

Figure 20:
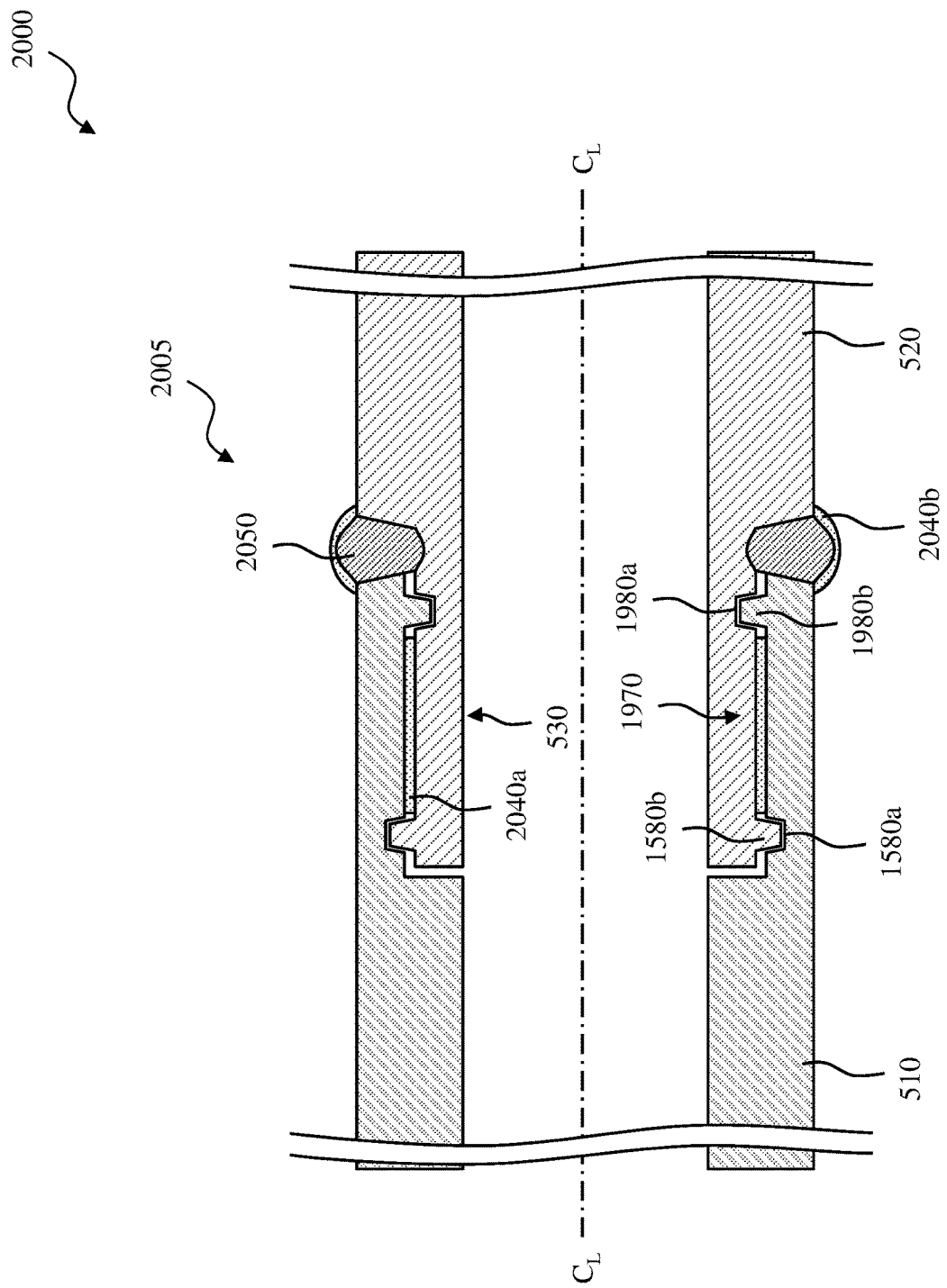

Turning to FIG. 20, depicted is a cross-sectional view of a downhole tool 2000 including a junction 2005 designed, manufactured and operated according to one or more alternative embodiments of the disclosure. The downhole tool 2000 having the junction 2005 is similar in many respects to the downhole tool 1900 of FIG. 19. Accordingly, like reference numbers have been used to indicate similar, if not identical, features. The downhole tool 2000 differs, for the most part, from the downhole tool 1900, in that the downhole tool 2000 contemplates corrosive fluid both inside the first member 510 and the second member 520 and outside of the first member 510 and the second member 520. Accordingly, a sandwich of a first crack compliant seal 2040a, a high yield strength weld 2050, and a second crack compliant weld 2040b is employed. In at least one embodiment, the first crack compliant seal 2040a is located axially between the collet finger 1580b and collet finger 1980b.

Figure 21:
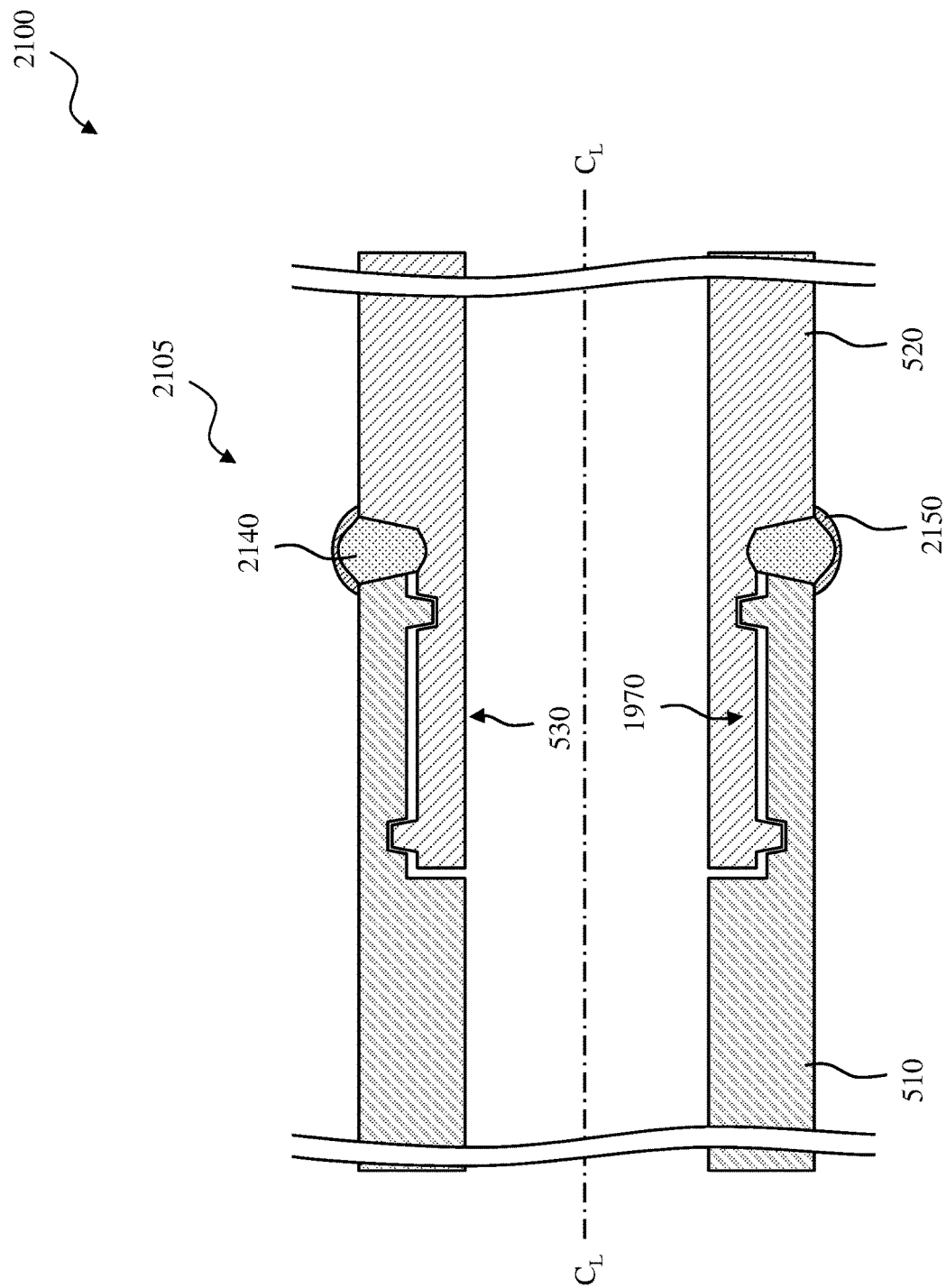

Turning to FIG. 21, depicted is a cross-sectional view of a downhole tool 2100 including a junction 2105 designed, manufactured and operated according to one or more alternative embodiments of the disclosure. The downhole tool 2100 having the junction 2105 is similar in many respects to the downhole tool 1900 of FIG. 19. Accordingly, like reference numbers have been used to indicate similar, if not identical, features. The downhole tool 2100 differs, for the most part, from the downhole tool 1900, in that the downhole tool 2100 further includes a high yield strength weld 2150 positioned at the overlapping space 530. In the illustrated embodiment, the crack compliant seal 2140 is located radially inside of the high yield strength weld 2150, the high yield strength weld 2150 providing additional burst and/or collapse support. The location of the crack compliant seal 2140 is, at least in part, based upon the corrosive fluid being location on an inside of the of the first member 510 and the second member 520.

Figure 22:
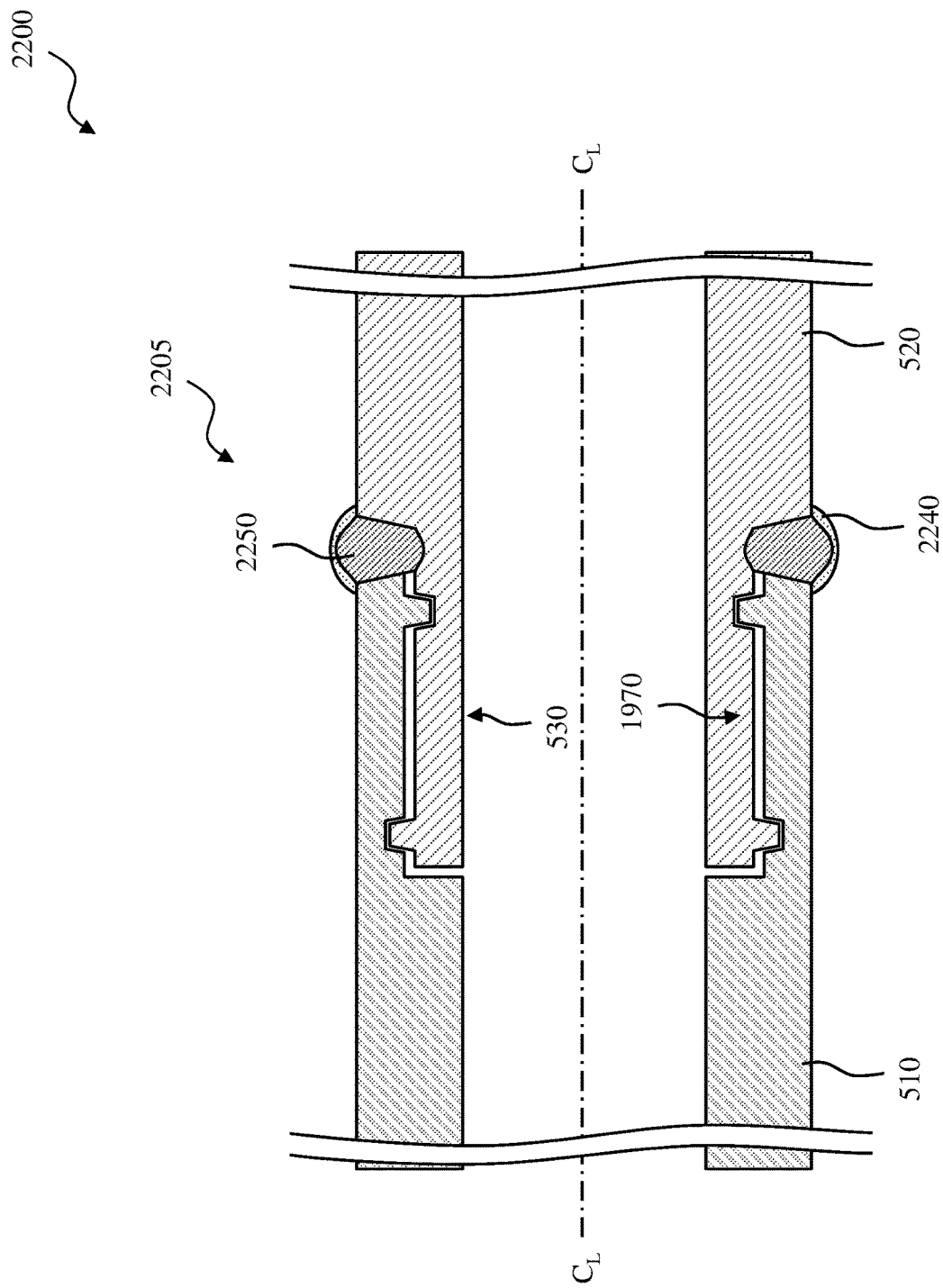

Turning to FIG. 22, depicted is a cross-sectional view of a downhole tool 2200 including a junction 2205 designed, manufactured and operated according to one or more alternative embodiments of the disclosure. The downhole tool 2200 having the junction 2205 is similar in many respects to the downhole tool 1900 of FIG. 19. Accordingly, like reference numbers have been used to indicate similar, if not identical, features. The downhole tool 2200 differs, for the most part, from the downhole tool 1900, in that the downhole tool 2200 further includes a high yield strength weld 2250 positioned at the overlapping space 530. In the illustrated embodiment, the crack compliant seal 2240 is located radially outside of the high yield strength weld 2250, the high yield strength weld 2250 providing additional burst and/or collapse support. The location of the crack compliant seal 2240 is, at least in part, based upon the corrosive fluid being location on an outside of the of the first member 510 and the second member 520.

Figure 23:
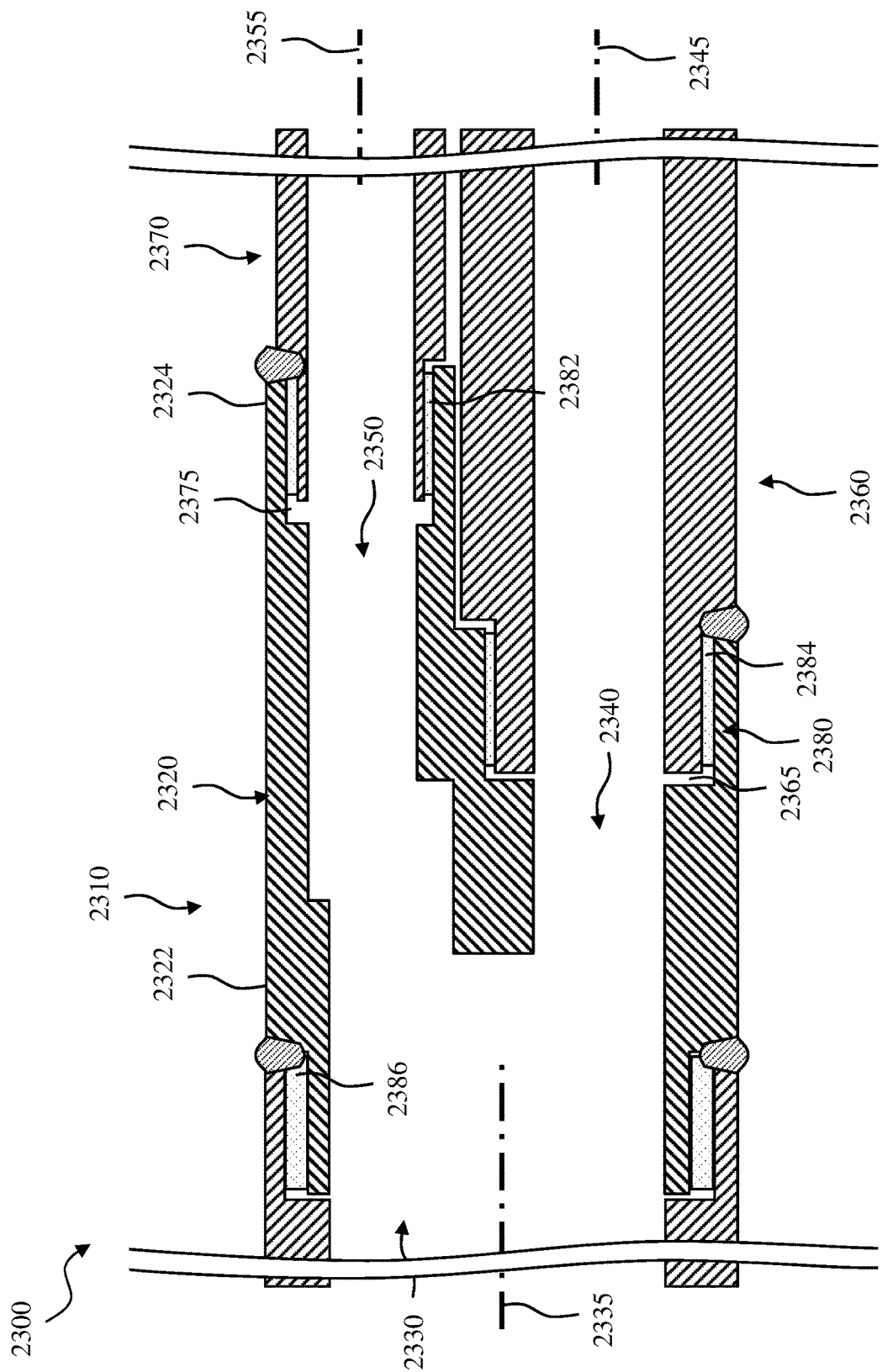

Turning to FIG. 23, illustrated is a multilateral junction 2300 designed, manufactured and operated according to one or more embodiments of the disclosure. The multilateral junction 2300 includes a y-block 2310. In accordance with one or more embodiments of the disclosure, the y-block 2310 includes a housing 2320 having a first end 2322 and a second opposing end 2324. The housing 2320, without limitation, may comprise steel or another suitable material.

Extending into the housing 2320 from the first end 2322 is a single first bore 2330. The single first bore 2330, in accordance with one embodiment, defines a first centerline 2335. The y-block 2310 additionally includes second and third separate bores 2340, 2350, respectively, extending into the housing 2320 and branching off from the single first bore 2330. In accordance with one or more embodiments, the second bore 2340 defines a second centerline 2345, and the third bore 2350 defining a third centerline 2355.

The multilateral junction 2300, as illustrated in FIG. 23, additionally includes a mainbore leg 2360 coupled to the second bore 2340 for extending into the main wellbore. In at least one embodiment, the mainbore leg 2360 and the second bore 2340 define a second overlapping space 2365. The multilateral junction 2300, as illustrated in FIG. 23, additionally includes a lateral bore leg 2370 coupled to the third bore 2350 for extending into the lateral wellbore. In at least one embodiment, the lateral bore leg 2370 and the third bore 2350 define a third overlapping space 2375. In at least one embodiment, one or both of the lateral bore leg 2370 or the main bore leg 2360 is an approximately D-shaped tube.

The multilateral junction 2300, in one or more embodiments, additionally includes a joint 2380 located in at least a portion of the second overlapping space 2365 or the third overlapping space 2375, the joint 2380 designed, manufactured and/or employed according to any one of the embodiments discussed above. In at least one embodiment, the joint 2380 is a lateral wellbore leg joint 2382 located in at least a portion of the third overlapping space 2375. In yet another embodiment, the joint 2380 is a main wellbore leg joint 2384 located in at least a portion of the second overlapping space 2365. In yet another embodiment, both the lateral wellbore leg joint 2382 and the main wellbore leg joint 2384 exist.

The multilateral junction 2300, in one or more embodiments, may additionally include a joint 2386 located in at least a portion of the single first bore 2330. For example, the joint 2386 may be used to couple an additional tubular to the single first bore 2330. In accordance with the disclosure, the joint 2386 may be designed, manufactured and/or employed according to any one of the embodiments discussed above.

It should also be noted that in certain other embodiments, the joints 2380 may be located in other portions of the multilateral junction 2300. For instance, a seal stinger could be coupled at the end of the mainbore leg 2360. In this embodiment, the joint 2380 may be used to couple the mainbore leg 2360 and the seal stinger. In another embodiment, a transition cross-over (e.g., D to round transition cross-over) could be coupled at the end of the lateral bore leg 2370. In this embodiment, the joint 2380 may be used to couple the lateral bore leg 2370 to the transition cross-over.

It should further be noted that even though FIG. 23 is directed to a downhole tool comprising a multilateral junction, in other embodiments the downhole tool could comprise a downhole packer, among other features.

Aspects disclosed herein include:

A. A downhole tool, the downhole tool including: 1) a first member, the first member having a first member inside diameter ($ID_1$), a first member outside diameter ($OD_1$), a first member thickness ($t_1$), and a first member hardness value ($HV_1$); 2) a second member, the second member having a second member inside diameter ($ID_2$), a second member outside diameter ($OD_2$), a second member thickness ($t_2$), and a second member hardness value ($HV_2$) the first and second members positioned proximate one another forming an overlapping space therebetween; 3) a crack compliant seal positioned at the overlapping space, the crack compliant seal having a compliant seal hardness value ($HV_{cs}$) less than or equal to one or more of the first member hardness value ($HV_1$) and second member hardness value ($HV_2$); and 4) a high yield strength weld positioned at the overlapping space, the high yield strength weld having a yield strength of at least 50 ksi.

B. A well system, the well system including: 1) a wellbore; 2) a downhole tool positioned within the wellbore, the downhole tool including: a) a first member, the first member having a first member inside diameter ($ID_1$), a first member outside diameter ($OD_1$), a first member thickness ($t_1$), and a first member hardness value ($HV_1$); b) a second member, the second member having a second member inside diameter ($ID_2$), a second member outside diameter ($OD_2$), a second member thickness ($t_2$), and a second member hardness value ($HV_2$) the first and second members positioned proximate one another forming an overlapping space therebetween; c) a crack compliant seal positioned at the overlapping space, the crack compliant seal having a compliant seal hardness value ($HV_{cs}$) less than or equal to one or more of the first member hardness value ($HV_1$) or second member hardness value ($HV_2$); and e) a high yield strength weld positioned at the overlapping space, the high yield strength weld having a yield strength of at least 50 ksi.

C. A method, the method including: 1) obtaining a first member, the first member having a first member inside diameter ($ID_1$), a first member outside diameter ($OD_1$), a first member thickness ($t_1$), and a first member hardness value ($HV_1$); 2) obtaining a second member, the second member having a second member inside diameter ($ID_2$), a second member outside diameter ($OD_2$), a second member thickness ($t_2$), and a second member hardness value ($HV_2$); 3) positioning the first and second members proximate one another forming an overlapping space therebetween, wherein a crack compliant seal having a compliant seal hardness value ($HV_{cs}$) less than or equal to one or more of the first member hardness value ($HV_1$) or second member hardness value ($HV_2$) is positioned at the overlapping space, and a high yield strength weld is positioned at the overlapping space, the high yield strength weld having a yield strength of at least 50 ksi.

D. A downhole tool, the downhole tool including: 1) a first member, the first member having a first member inside diameter ($ID_1$), a first member outside diameter ($OD_1$), a first member thickness ($t_1$), and a first member hardness value ($HV_1$); 2) a second member, the second member having a second member inside diameter ($ID_2$), a second member outside diameter ($OD_2$), a second member thickness ($t_2$), and a second member hardness value ($HV_2$), the first and second members positioned proximate one another forming an overlapping space therebetween; 3) a geometric mechanical strengthening feature located between the first member and the second member, the geometric mechanical strengthening feature configured to increase an engineering rating of the overlapping space; and 4) a crack compliant seal positioned at the overlapping space, the crack compliant seal having a compliant seal hardness value ($HV_{cs}$) less than or equal to one or more of the first member hardness value ($HV_1$) or second member hardness value ($HV_2$).

E. A well system, the well system including: 1) a wellbore; 2) a downhole tool positioned within the wellbore, the downhole tool including: a) a first member, the first member having a first member inside diameter ($ID_1$), a first member outside diameter ($OD_1$), a first member thickness ($t_1$), and a first member hardness value ($HV_1$); b) a second member, the second member having a second member inside diameter ($ID_2$), a second member outside diameter ($OD_2$), a second member thickness ($t_2$), and a second member hardness value ($HV_2$) the first and second members positioned proximate one another forming an overlapping space therebetween; c) a geometric mechanical strengthening feature located between the first member and the second member, the geometric mechanical strengthening feature configured to increase an engineering rating of the overlapping space; and d) a crack compliant seal positioned at the overlapping space, the crack compliant seal having a compliant seal hardness value ($HV_{cs}$) less than or equal to one or more of the first member hardness value ($HV_1$) or second member hardness value ($HV_2$).

F. A method, the method including: 1) obtaining a first member, the first member having a first member inside diameter ($ID_1$), a first member outside diameter ($OD_1$), a first member thickness ($t_1$), and a first member hardness value ($HV_1$); 2) obtaining a second member, the second member having a second member inside diameter ($ID_2$), a second member outside diameter ($OD_2$), a second member thickness ($t_2$), and a second member hardness value ($HV_2$); 3) coupling the first and second members together using a geometric mechanical strengthening feature forming an overlapping space therebetween, wherein a crack compliant seal is positioned at the overlapping space, the crack compliant seal having a compliant seal hardness value ($HV_{cs}$) less than or equal to one or more of the first member hardness value ($HV_1$) or second member hardness value ($HV_2$).

Aspects A, B, C, D, E, and F may have one or more of the following additional elements in combination: Element 1: wherein the compliant seal hardness value ($HV_{cs}$) is a post weld heat treatment compliant seal hardness value ($HV_{cs-pw}$). Element 2: wherein the post weld compliant seal hardness value ($HV_{cs-pw}$) is 250 or less. Element 3: wherein the post weld compliant seal hardness value ($HV_{cs-pw}$) is 250 or less after being subjected to the post weld heat treatment of at least 620° C. Element 4: wherein the crack compliant seal includes no more than 1% mass fraction of nickel. Element 5: wherein the crack compliant seal is located radially inside of the high yield strength weld. Element 6: wherein the crack compliant seal is a first crack compliant seal, and further including a second crack compliant seal located radially outside of the high yield strength weld. Element 7: wherein the second crack compliant seal is a second crack compliant weld. Element 8: wherein the crack compliant seal is located radially outside of the high yield strength weld. Element 9: wherein the crack compliant seal is a crack compliant weld. Element 10: wherein the overlapping space is a butt joint. Element 11: wherein the second member outside diameter ($OD_2$) is less than the first member inside diameter ($ID_1$), the second member having slid into the first member to form an overlapping joint. Element 12: wherein the crack compliant seal is at least partially located within an axial extending portion of the overlapping joint and the high yield strength weld is at least partially located within a radial extending portion of the overlapping joint. Element 13: wherein the wherein the crack compliant seal is a first crack compliant seal, and further including a second crack compliant seal located radially outside of the high yield strength weld. Element 14: further including a geometric mechanical strengthening feature located between the first member and the second member. Element 15: wherein the geometric mechanical strengthening feature is a first set of threads in the first member inside diameter ($ID_1$) and a second set of threads in the second member outside diameter ($OD_2$). Element 16: wherein the geometric mechanical strengthening feature is a collet feature in one of the first member or the second member. Element 17: wherein the first member forms at least a portion of a y-block of a multilateral junction and the second member forms at least a portion of a multilateral mainbore leg or lateral bore leg. Element 18: wherein the first member and the second member form at least a portion of downhole packer. Element 19: wherein the high yield strength weld has a yield strength of at least 80 ksi. Element 20: wherein the first member and second member form at least a portion of a downhole tool, and further including positioning the downhole tool including the crack compliant seal and the high yield strength weld within a wellbore. Element 21: wherein the geometric mechanical strengthening feature is a collet feature in one of the first member or the second member forming an overlapping joint. Element 22: wherein the collet feature includes a collet finger in one of the first member or the second member and a collet finger profile in an other of the second member or the first member, and further wherein the crack compliant material is axially located between the collet finger profile and a radial extending portion of the overlapping joint. Element 23: wherein the geometric mechanical strengthening feature is a first set of threads in the first member inside diameter ($ID_1$) and a second set of threads in the second member outside diameter ($OD_2$) forming an overlapping joint. Element 24: wherein the crack compliant material is located within an axial extending portion of the overlapping joint. Element 25: wherein the crack compliant material is located between the first set of threads and the second set of threads. Element 26: wherein the crack compliant material is located within a radial extending portion of the overlapping joint. Element 27: further including a high yield strength weld positioned at the overlapping space radially outside of the crack compliant material, the high yield strength weld having a yield strength of at least 50 ksi. Element 28: wherein the crack compliant seal is a first crack compliant seal, and further including a second crack compliant seal located radially outside of the high yield strength weld. Element 29: wherein the high yield strength weld is located within a radial extending portion of the overlapping joint.

Those skilled in the art to which this application relates will appreciate that other and further additions, deletions, substitutions and modifications may be made to the described embodiments.

What is claimed is:

1. A downhole tool, comprising:
a first member, the first member having a first member inside diameter ($ID_1$), a first member outside diameter ($OD_1$), a first member thickness ($t_1$), and a first member hardness value ($HV_1$);
a second member, the second member having a second member inside diameter ($ID_2$), a second member outside diameter ($OD_2$), a second member thickness ($t_2$), and a second member hardness value ($HV_2$), the first and second members positioned proximate one another forming an overlapping space therebetween;
a geometric mechanical strengthening feature located between the first member and the second member, the geometric mechanical strengthening feature configured to increase an engineering rating of the overlapping space; and
a crack compliant seal positioned at the overlapping space, the crack compliant seal having a compliant seal hardness value ($HV_{cs}$) less than or equal to one or more of the first member hardness value ($HV_1$) or second member hardness value ($HV_2$), wherein the geometric mechanical strengthening feature is a collet feature in one of the first member or the second member forming an overlapping joint, and further wherein the collet feature includes a collet finger in one of the first member or the second member and a collet finger profile in an other of the second member or the first member, and further wherein the crack compliant material is axially located between the collet finger profile and a radial extending portion of the overlapping joint.

2. The downhole tool as recited in claim 1, wherein the compliant seal hardness value ($HV_{cs}$) is a post weld heat treatment compliant seal hardness value ($HV_{cs-pw}$).

3. The downhole tool as recited in claim 2, wherein the post weld compliant seal hardness value ($HV_{cs-pw}$) is 250 or less.

4. The downhole tool as recited in claim 3, wherein the post weld compliant seal hardness value ($HV_{cs-pw}$) is 250 or less after being subjected to the post weld heat treatment of at least 620° C.

5. The downhole tool as recited in claim 4, wherein the crack compliant seal includes no more than 1% mass fraction of nickel.

6. The downhole tool as recited in claim 1, further including a high yield strength weld positioned at the overlapping space radially outside of the crack compliant material, the high yield strength weld having a yield strength of at least 50 ksi.

7. The downhole tool as recited in claim 6, wherein the crack compliant seal is a first crack compliant seal, and further including a second crack compliant seal located radially outside of the high yield strength weld.

8. The downhole tool as recited in claim 7, wherein the high yield strength weld is located within a radial extending portion of the overlapping joint.

9. The downhole tool as recited in claim 6, wherein the high yield strength weld has a yield strength of at least 80 ksi.

10. A well system, comprising:
a wellbore;
a downhole tool positioned within the wellbore, the downhole tool including:
a first member, the first member having a first member inside diameter ($ID_1$), a first member outside diameter ($OD_1$), a first member thickness ($t_1$), and a first member hardness value ($HV_1$);
a second member, the second member having a second member inside diameter ($ID_2$), a second member outside diameter ($OD_2$), a second member thickness ($t_2$), and a second member hardness value ($HV_2$) the first and second members positioned proximate one another forming an overlapping space therebetween;
a geometric mechanical strengthening feature located between the first member and the second member, the geometric mechanical strengthening feature configured to increase an engineering rating of the overlapping space; and
a crack compliant seal positioned at the overlapping space, the crack compliant seal having a compliant seal hardness value ($HV_{cs}$) less than or equal to one or more of the first member hardness value ($HV_1$) or second member hardness value ($HV_2$), wherein the geometric mechanical strengthening feature is a collet feature in one of the first member or the second member forming an overlapping joint, and further wherein the collet feature includes a collet finger in one of the first member or the second member and a collet finger profile in an other of the second member or the first member, and further wherein the crack compliant material is axially located between the collet finger profile and a radial extending portion of the overlapping joint.

11. The well system as recited in claim 10, wherein the compliant seal hardness value ($HV_{cs}$) is a post weld heat treatment compliant seal hardness value ($HV_{cs-pw}$).

12. The well system as recited in claim 11, wherein the post weld compliant seal hardness value ($HV_{cs-pw}$) is 250 or less.

13. The well system as recited in claim 12, wherein the post weld compliant seal hardness value ($HV_{cs-pw}$) is 250 or less after being subjected to the post weld heat treatment of at least 620° C.

14. The well system tool as recited in claim 13, wherein the crack compliant seal includes no more than 1% mass fraction of nickel.

15. The well system as recited in claim 10, further including a high yield strength weld positioned at the overlapping space radially outside of the crack compliant material, the high yield strength weld having a yield strength of at least 50 ksi.

16. The well system as recited in claim 15, wherein the crack compliant seal is a first crack compliant seal, and further including a second crack compliant seal located radially outside of the high yield strength weld.

17. The well system as recited in claim 16, wherein the high yield strength weld is located within a radial extending portion of the overlapping joint.

18. The well system as recited in claim 15, wherein the high yield strength weld has a yield strength of at least 80 ksi.

19. A method, comprising:
obtaining a first member, the first member having a first member inside diameter ($ID_1$), a first member outside diameter ($OD_1$), a first member thickness ($t_1$), and a first member hardness value ($HV_1$);
obtaining a second member, the second member having a second member inside diameter ($ID_2$), a second member outside diameter ($OD_2$), a second member thickness ($t_2$), and a second member hardness value ($HV_2$); and
coupling the first and second members together using a geometric mechanical strengthening feature forming an overlapping space therebetween, wherein a crack compliant seal is positioned at the overlapping space, the crack compliant seal having a compliant seal hardness value ($HV_{cs}$) less than or equal to one or more of the first member hardness value ($HV_1$) or second member hardness value ($HV_2$), wherein the geometric mechanical strengthening feature is a collet feature in one of the first member or the second member forming an overlapping joint, and further wherein the collet feature includes a collet finger in one of the first member or the second member and a collet finger profile in an other of the second member or the first member, and further wherein the crack compliant material is axially located between the collet finger profile and a radial extending portion of the overlapping joint.

20. The method as recited in claim 19, wherein the compliant seal hardness value ($HV_{cs}$) is a post weld heat treatment compliant seal hardness value ($HV_{cs-pw}$).

21. The method as recited in claim 20, wherein the post weld compliant seal hardness value ($HV_{cs-pw}$) is 250 or less.

22. The method as recited in claim 21, wherein the post weld compliant seal hardness value ($HV_{cs-pw}$) is 250 or less after being subjected to the post weld heat treatment of at least 620° C.

23. The method tool as recited in claim 22, wherein the crack compliant seal includes no more than 1% mass fraction of nickel.

24. The method as recited in claim 19, wherein the first member and second member form at least a portion of a downhole tool, and further including positioning the downhole tool including the crack compliant seal within a wellbore.

25. The method as recited in claim 19, wherein the first member forms at least a portion of a y-block of a multilateral junction and the second member forms at least a portion of a multilateral mainbore leg or lateral bore leg.

26. The method as recited in claim 19, wherein the first member and the second member form at least a portion of downhole packer.

27. A downhole tool, comprising:
   a first member, the first member having a first member inside diameter ($ID_1$), a first member outside diameter ($OD_1$), a first member thickness ($t_1$), and a first member hardness value ($HV_1$);
   a second member, the second member having a second member inside diameter ($ID_2$), a second member outside diameter ($OD_2$), a second member thickness ($t_2$), and a second member hardness value ($HV_2$), the first and second members positioned proximate one another forming an overlapping space therebetween;
   a geometric mechanical strengthening feature located between the first member and the second member, the geometric mechanical strengthening feature configured to increase an engineering rating of the overlapping space; and
   a crack compliant seal positioned at the overlapping space, the crack compliant seal having a compliant seal hardness value ($HV_{cs}$) less than or equal to one or more of the first member hardness value ($HV_1$) or second member hardness value ($HV_2$), further including a high yield strength weld positioned at the overlapping space radially outside of the crack compliant material, the high yield strength weld having a yield strength of at least 50 ksi, wherein the crack compliant seal is a first crack compliant seal, and further including a second crack compliant seal located radially outside of the high yield strength weld.

28. A well system, comprising:
a wellbore;
a downhole tool positioned within the wellbore, the downhole tool including:
   a first member, the first member having a first member inside diameter ($ID_1$), a first member outside diameter ($OD_1$), a first member thickness ($t_1$), and a first member hardness value ($HV_1$);
   a second member, the second member having a second member inside diameter ($ID_2$), a second member outside diameter ($OD_2$), a second member thickness ($t_2$), and a second member hardness value ($HV_2$) the first and second members positioned proximate one another forming an overlapping space therebetween;
   a geometric mechanical strengthening feature located between the first member and the second member, the geometric mechanical strengthening feature configured to increase an engineering rating of the overlapping space; and
   a crack compliant seal positioned at the overlapping space, the crack compliant seal having a compliant seal hardness value ($HV_{cs}$) less than or equal to one or more of the first member hardness value ($HV_1$) or second member hardness value ($HV_2$), further including a high yield strength weld positioned at the overlapping space radially outside of the crack compliant material, the high yield strength weld having a yield strength of at least 50 ksi, wherein the crack compliant seal is a first crack compliant seal, and further including a second crack compliant seal located radially outside of the high yield strength weld.

29. A method, comprising:
obtaining a first member, the first member having a first member inside diameter ($ID_1$), a first member outside diameter ($OD_1$), a first member thickness ($t_1$), and a first member hardness value ($HV_1$);
obtaining a second member, the second member having a second member inside diameter ($ID_2$), a second member outside diameter ($OD_2$), a second member thickness ($t_2$), and a second member hardness value ($HV_2$);
coupling the first and second members together using a geometric mechanical strengthening feature forming an overlapping space therebetween, wherein a crack compliant seal is positioned at the overlapping space, the crack compliant seal having a compliant seal hardness value ($HV_{cs}$) less than or equal to one or more of the first member hardness value ($HV_1$) or second member hardness value ($HV_2$); and
positioning a high yield strength weld at the overlapping space radially outside of the crack compliant material, the high yield strength weld having a yield strength of at least 50 ksi, wherein the crack compliant seal is a first crack compliant seal, and further including a second crack compliant seal located radially outside of the high yield strength weld.

* * * * *